United States Patent
Imoto et al.

(10) Patent No.: US 12,094,098 B2
(45) Date of Patent: Sep. 17, 2024

(54) DEFECT MANAGEMENT APPARATUS, METHOD AND NON-TRANSITORY COMPUTER READABLE MEDIUM

(71) Applicant: KABUSHIKI KAISHA TOSHIBA, Tokyo (JP)

(72) Inventors: Kazunori Imoto, Kawasaki (JP); Tomohiro Nakai, Kawasaki (JP); Tsukasa Ike, Tokyo (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 406 days.

(21) Appl. No.: 17/186,402

(22) Filed: Feb. 26, 2021

(65) Prior Publication Data
US 2022/0076404 A1     Mar. 10, 2022

(30) Foreign Application Priority Data
Sep. 9, 2020 (JP) ................. 2020-151405

(51) Int. Cl.
*G06T 7/00* (2017.01)
*G06F 18/214* (2023.01)
(Continued)

(52) U.S. Cl.
CPC .......... *G06T 7/0004* (2013.01); *G06F 18/214* (2023.01); *G06F 18/241* (2023.01);
(Continued)

(58) Field of Classification Search
CPC ......... G06T 7/0004; G06T 2207/20076; G06T 2207/20081; G06T 2207/20084;
(Continued)

(56) References Cited

U.S. PATENT DOCUMENTS 7,295,304 B2 * 11/2007 Yamaguchi ............... G03F 1/84
    356/237.4
8,081,814 B2 * 12/2011 Matsushita ........... G06T 7/0004
    382/141

(Continued)

FOREIGN PATENT DOCUMENTS

| JP | 2005-293264 A | 10/2005 |
| JP | 2012-225768 A | 11/2012 |

(Continued)

OTHER PUBLICATIONS

Imoto, K. et al., "A CNN-Based Transfer Learning Method for Defect Classification in Semiconductor Manufacturing," IEEE Transactions on Semiconductor Manufacturing, vol. 32, No. 4, doi: 10.1109/TSM.2019.2941752, Nov. 2019, 5 pages.

*Primary Examiner* — Samir A Ahmed
(74) *Attorney, Agent, or Firm* — Oblon, McClelland, Maier & Neustadt, L.L.P.

(57) ABSTRACT

According to one embodiment, a defect management apparatus includes a processor. The processor acquires first information and second information, the first information including first defect positions relating to defects detected with a first device for an inspection target and corresponding first labels indicating classifications of the defects, the second information including second defect positions relating to defects detected with a second device for the inspection target. The processor determines a first defect position corresponding to a second defect position as a corresponding defect position. The processor diverts the first label corresponding to the corresponding defect position as a second label of the second defect position.

9 Claims, 26 Drawing Sheets

(51) Int. Cl.
  *G06F 18/241* (2023.01)
  *G06N 3/08* (2023.01)
(52) U.S. Cl.
  CPC ...... *G06N 3/08* (2013.01); *G06T 2207/20076* (2013.01); *G06T 2207/20081* (2013.01); *G06T 2207/20084* (2013.01); *G06T 2207/30148* (2013.01)
(58) Field of Classification Search
  CPC ........... G06T 2207/30148; G06T 7/001; G06F 18/214; G06F 18/241; G06N 3/08; G06N 3/045; G06N 3/047; G06N 3/084; G06V 10/764; G06V 10/774; G06V 20/69
  See application file for complete search history.

(56) References Cited

U.S. PATENT DOCUMENTS

| | | | | |
|---|---|---|---|---|
| 8,811,713 | B2* | 8/2014 | Yoshikawa | G03F 1/84 430/5 |
| 2004/0115541 | A1* | 6/2004 | Yamaguchi | G03F 1/84 430/30 |
| 2004/0151362 | A1* | 8/2004 | Hamaguchi | G06T 7/41 382/145 |
| 2007/0009152 | A1 | 1/2007 | Kanda | |
| 2008/0226153 | A1* | 9/2008 | Ono | G06F 18/22 382/141 |
| 2009/0220142 | A1* | 9/2009 | Matsushita | G06T 7/0004 382/149 |
| 2010/0054577 | A1* | 3/2010 | Yoshikawa | G03F 1/84 382/144 |
| 2011/0299069 | A1* | 12/2011 | Jang | G01N 23/2251 356/237.2 |
| 2014/0072204 | A1 | 3/2014 | Minekawa et al. | |
| 2018/0063488 | A1* | 3/2018 | Sekine | G06T 7/001 |
| 2019/0139210 | A1* | 5/2019 | Kondo | G06V 10/772 |
| 2020/0334801 | A1 | 10/2020 | Takahashi et al. | |

FOREIGN PATENT DOCUMENTS

| | | | |
|---|---|---|---|
| JP | 2017-117139 A | | 6/2017 |
| JP | WO 2019/111339 A1 | | 12/2020 |
| WO | WO 2012046431 | * | 4/2012 |

* cited by examiner

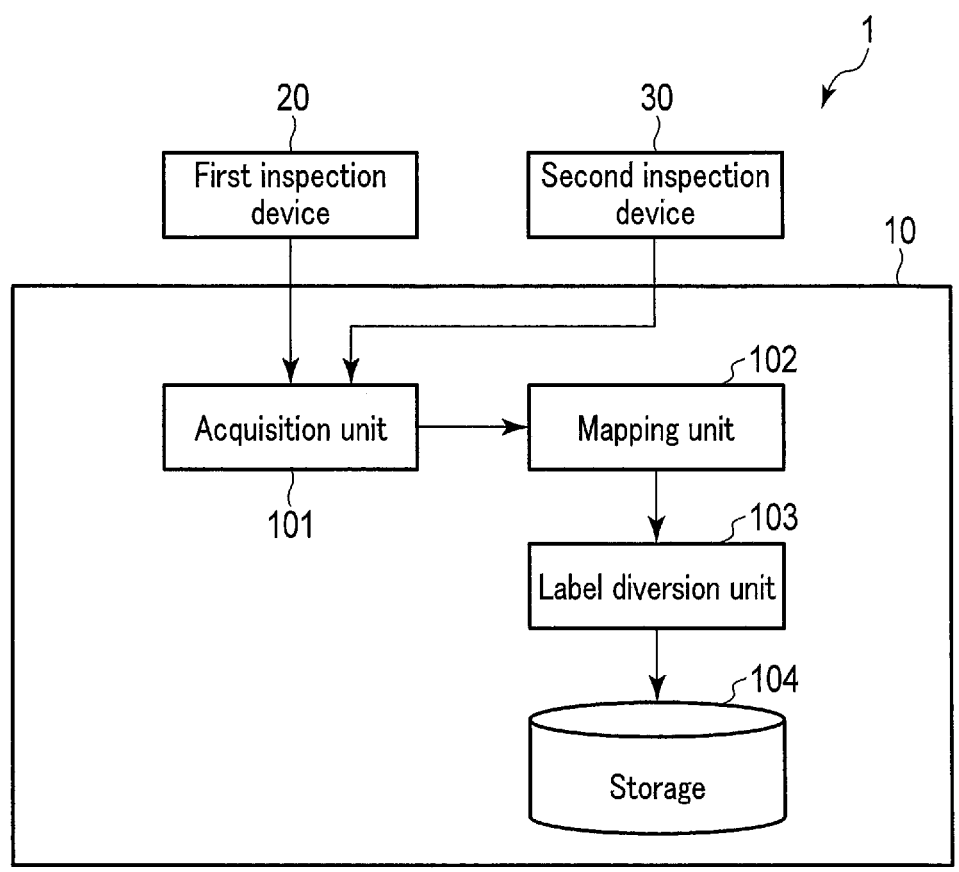
F I G. 1

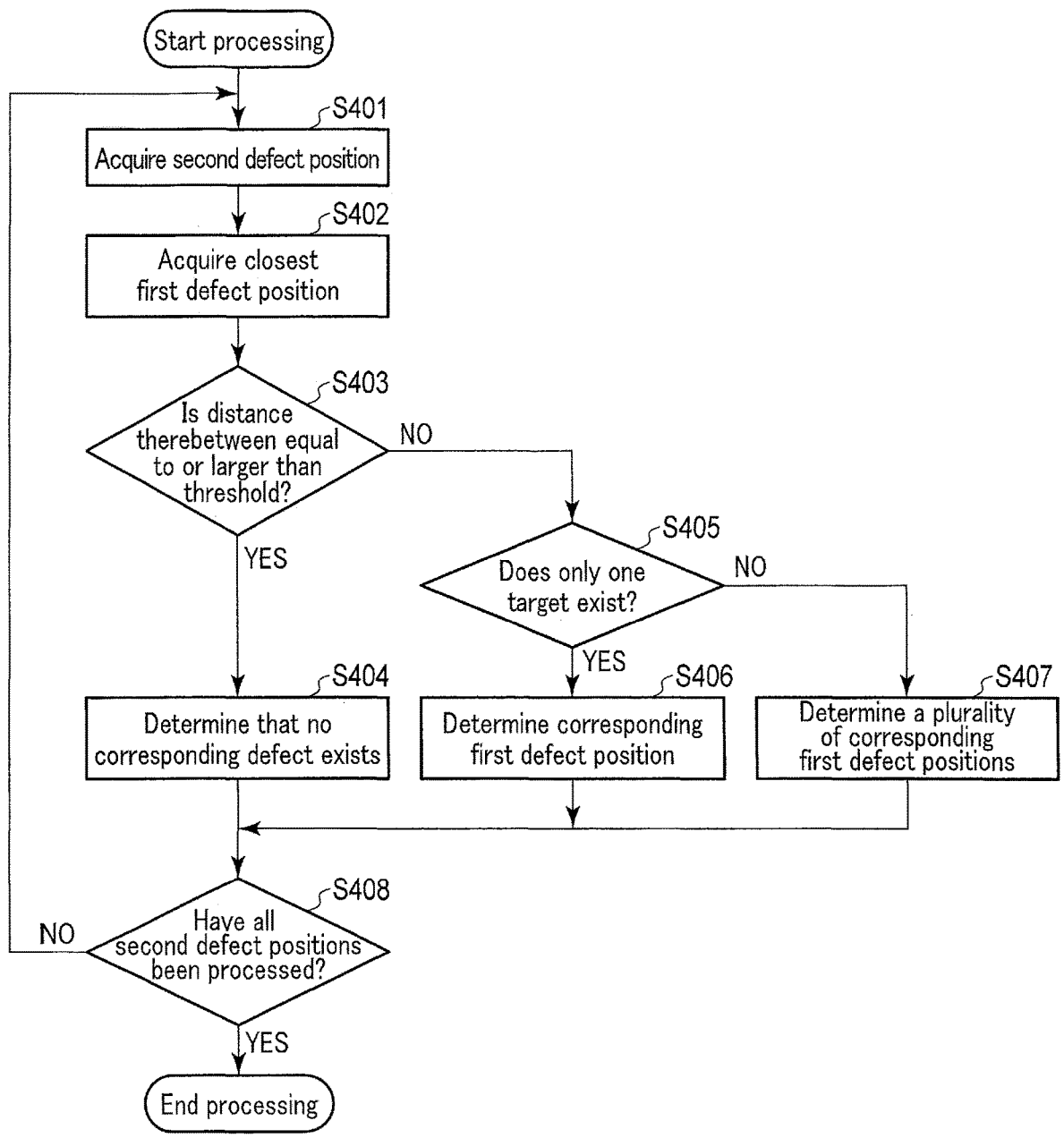
F I G. 4

| Identification number (Second defect position) | Corresponding identification number (First defect position) |
|---|---|
| 101 | 001 |
| 102 | 003 |
| 103 | 004 |
| 104 | --- |
| 105 | 007 |
| 106 | 007 |
| 107 | 007 |
| 108 | 008 |
| 109 | 009 |
| 110 | 010 |
| 111 | 011 |
| 112 | 011 |
| 113 | 012, 013 |

F I G. 5

| Identification number (Second defect position) | Corresponding identification number (First defect position) | Diversion label |
|---|---|---|
| 101 | 001 | 1 |
| 102 | 003 | 3 |
| 103 | 004 | 3 |
| 104 | --- | --- |
| 105 | 007 | 1 |
| 106 | 007 | 1 |
| 107 | 007 | 1 |
| 108 | 008 | 4 |
| 109 | 009 | 4 |
| 110 | 010 | 4 |
| 111 | 011 | 1 |
| 112 | 011 | 1 |
| 113 | 012、013 | 2 |
FIG. 7
| Identification number | X coordinate | Y coordinate | Diversion label | Image data |
|---|---|---|---|---|
| 101 | 7 | 1 | 1 |  |
| 102 | 18 | 2 | 3 |  |
| 103 | 17 | 3 | 3 |  |
| 104 | 7 | 6 | --- |  |
| 105 | 11 | 9 | 1 |  |
| 106 | 12 | 9 | 1 |  |
| 107 | 12 | 10 | 1 |  |
| 108 | 8 | 12 | 4 |  |
| 109 | 6 | 14 | 4 |  |
| 110 | 5 | 15 | 4 |  |
| 111 | 17 | 16 | 1 |  |
| 112 | 18 | 16 | 1 |  |
| 113 | 7 | 19 | 2 |  |
FIG. 8

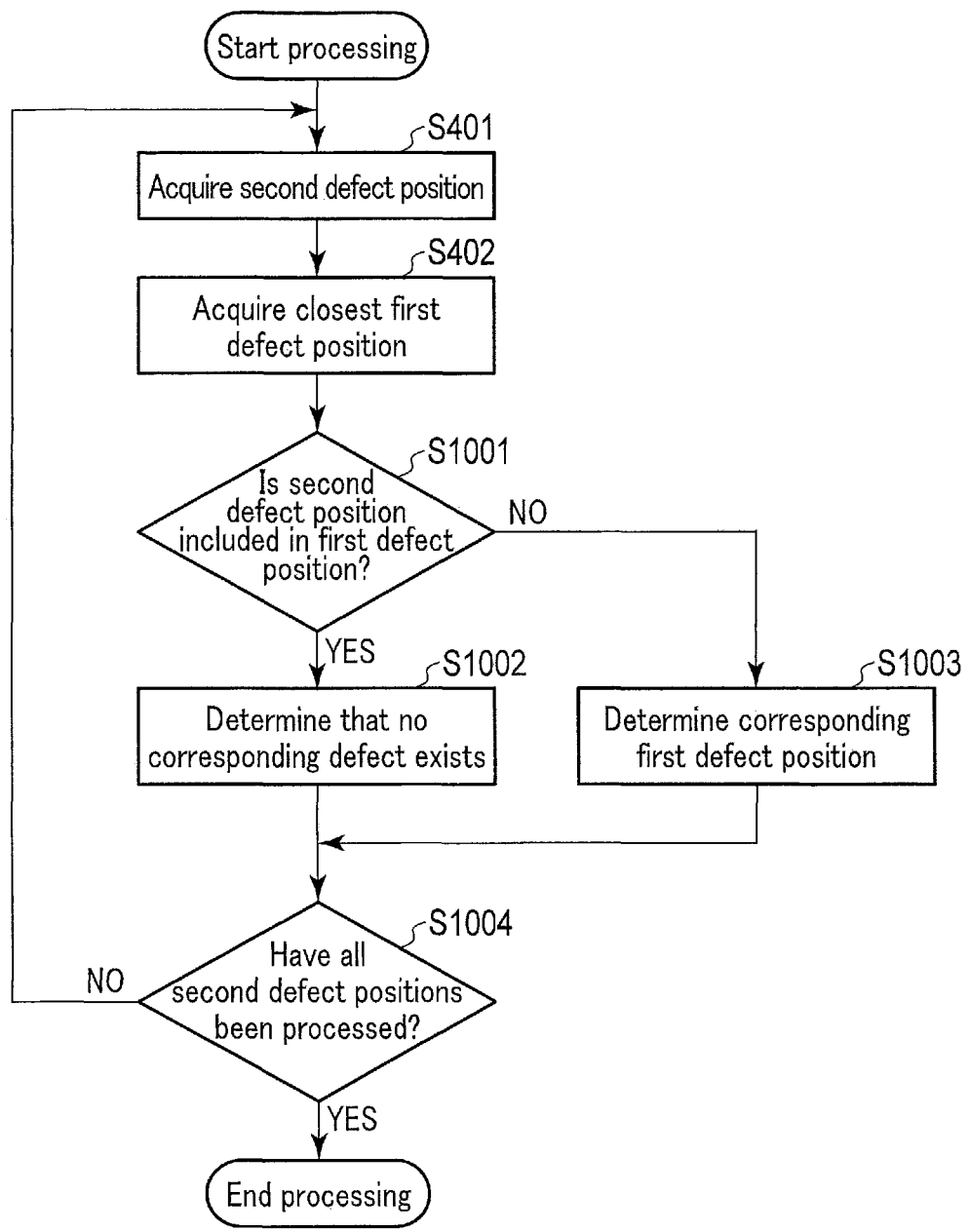
F I G. 10

| Identification number (Second defect position) | Corresponding identification number (First defect position) |
|---|---|
| 101 | 001 |
| 102 | 002 |
| 103 | --- |
| 104 | --- |
| 105 | 004 |
| 106 | 004 |
| 107 | 004 |
| 108 | 006 |
| 109 | 007 |
| 110 | 007 |
| 111 | --- |
| 112 | --- |
| 113 | 010 |

FIG. 11

| Identification number (Second defect position) | Corresponding identification number (First defect position) | Diversion label |
|---|---|---|
| 101 | 001 | 1 |
| 102 | 002 | 3 |
| 103 | --- | -- |
| 104 | --- | -- |
| 105 | 004 | 1 |
| 106 | 004 | 1 |
| 107 | 004 | 1 |
| 108 | 006 | 4 |
| 109 | 007 | 4 |
| 110 | 007 | 4 |
| 111 | --- | -- |
| 112 | --- | -- |
| 113 | 010 | 1 |

FIG. 12

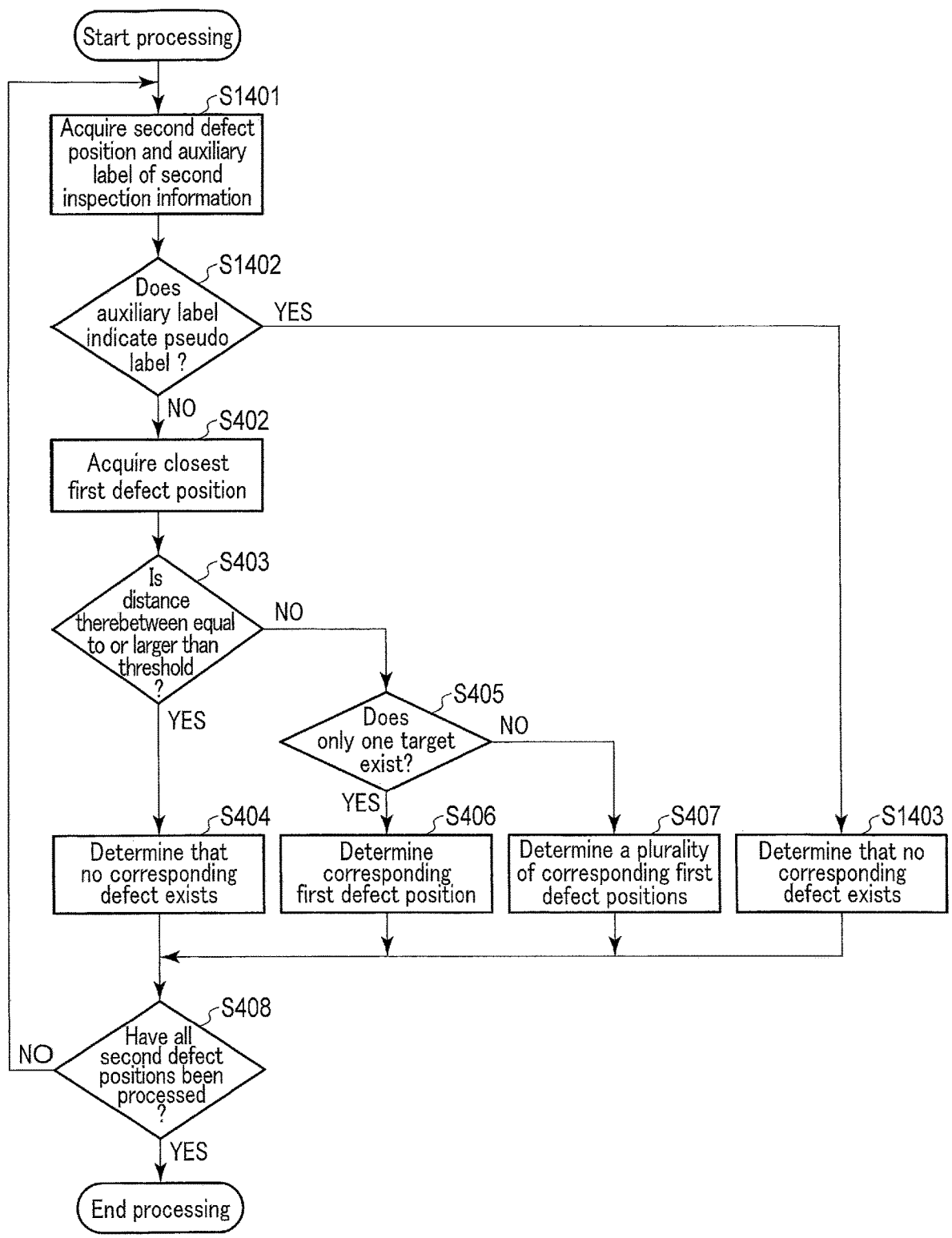
F I G. 14

| Identification number (Second defect position) | Corresponding identification number (First defect position) |
|---|---|
| 101 | 001 |
| 102 | --- |
| 103 | 004 |
| 104 | --- |
| 105 | 007 |
| 106 | --- |
| 107 | 007 |
| 108 | --- |
| 109 | 009 |
| 110 | 010 |
| 111 | 011 |
| 112 | --- |
| 113 | 012, 013 |

FIG. 15

| Identification number (Second defect position) | Corresponding identification number (First defect position) | Diversion label |
|---|---|---|
| 101 | 001 | 1 |
| 102 | --- | --- |
| 103 | 004 | 3 |
| 104 | --- | --- |
| 105 | 007 | 1 |
| 106 | --- | --- |
| 107 | 007 | 1 |
| 108 | --- | --- |
| 109 | 009 | 4 |
| 110 | 010 | 4 |
| 111 | 011 | 1 |
| 112 | --- | --- |
| 113 | 012, 013 | 2 |

FIG. 16

| Classification label | Influence range |
|---|---|
| 1 (Half-tone dot meshing) | 2 |
| 2 (Black) | 1 |
| 3 (Polka-dot) | 1 |
| 4 (Oblique line) | 3 |
F I G. 17
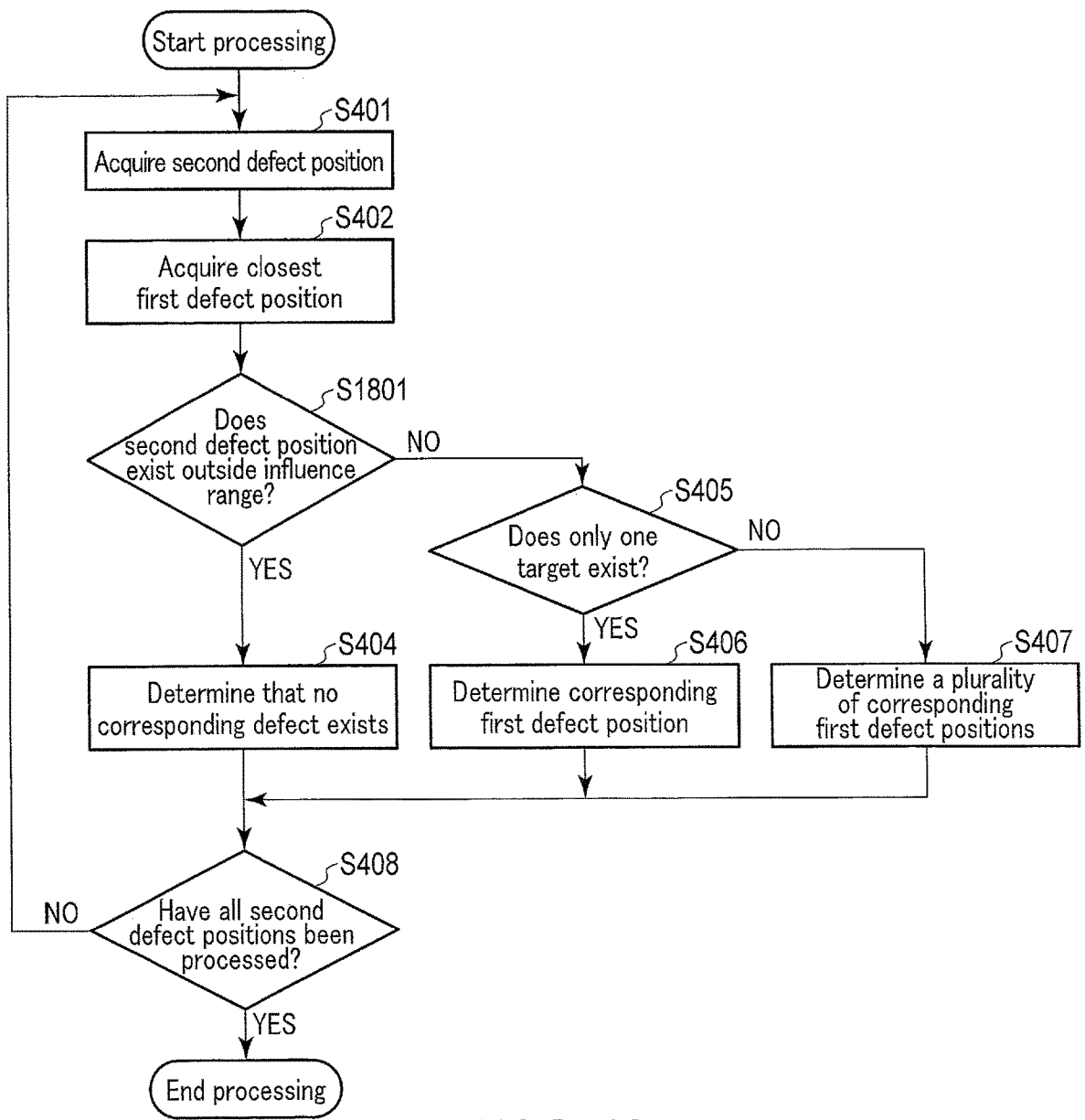
F I G. 18

| Identification number (Second defect position) | Corresponding identification number (First defect position) |
|---|---|
| 101 | 001 |
| 102 | 003 |
| 103 | 004 |
| 104 | ---- |
| 105 | 007 |
| 106 | 007 |
| 107 | 007 |
| 108 | 008 |
| 109 | 009 |
| 110 | 010 |
| 111 | 011 |
| 112 | 011 |
| 113 | 013 |

F I G. 19

| Identification number (Second defect position) | Corresponding identification number (First defect position) | Diversion label |
|---|---|---|
| 101 | 001 | 1 |
| 102 | 003 | 3 |
| 103 | 004 | 3 |
| 104 | ---- | -- |
| 105 | 007 | 1 |
| 106 | 007 | 1 |
| 107 | 007 | 1 |
| 108 | 008 | 4 |
| 109 | 009 | 4 |
| 110 | 010 | 4 |
| 111 | 011 | 1 |
| 112 | 011 | 1 |
| 113 | 013 | 1 |

F I G. 20

| First classification label \ Second classification label | A | B | C | D |
|---|---|---|---|---|
| 1 | 3 | | 1 | |
| 2 | | | 2 | |
| 3 | | 2 | | |
| 4 | | | | 3 |

F I G. 23

| Identification number (Second defect position) | Co-occurrence label pair |
|---|---|
| 101 | A-1 |
| 102 | B-3 |
| 103 | B-3 |
| 104 | C-2 |
| 105 | C-2 |
| 106 | A-1 |
| 107 | B-3 |
| 108 | B-3 |
| 109 | D-4 |
| 110 | D-4 |
| 111 | D-4 |
| 112 | A-1 |
| 113 | A-1 |
| 114 | C-2 |

F I G. 24

| Identification number (Second defect position) | Co-occurrence label pair | Diversion label |
|---|---|---|
| 101 | A-1 | 1 |
| 102 | B-3 | 3 |
| 103 | B-3 | 3 |
| 104 | C-2 | 2 |
| 105 | C-2 | 2 |
| 106 | A-1 | 1 |
| 107 | B-3 | 3 |
| 108 | B-3 | 3 |
| 109 | D-4 | 4 |
| 110 | D-4 | 4 |
| 111 | D-4 | 4 |
| 112 | A-1 | 1 |
| 113 | A-1 | 1 |
| 114 | C-2 | 2 |
F I G. 25
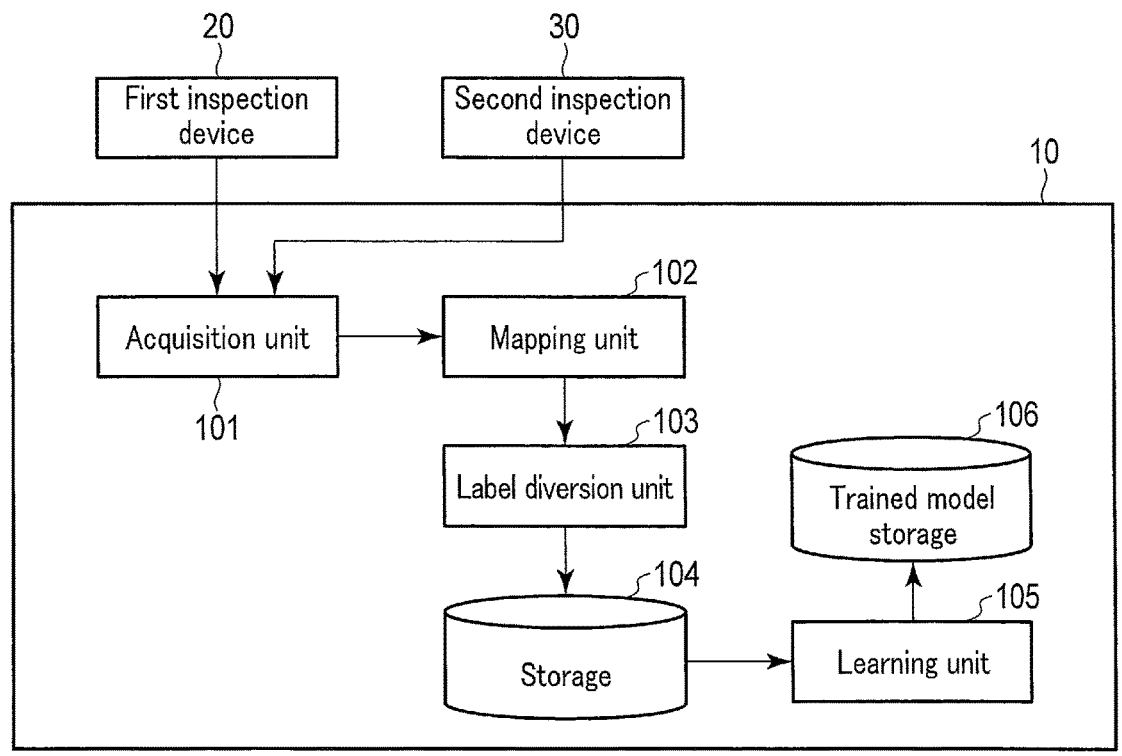
F I G. 26

(a)

(b)

| Identification number | X coordinate | Y coordinate | Classification label | Probability |
|---|---|---|---|---|
| 001 | 7 | 1 | 1 (Half-tone dot meshing) | 0.90 |
| 002 | 17 | 2 | 3 (Polka-dot) | 0.75 |
| 003 | 18 | 2 | 3 (Polka-dot) | 0.80 |
| 004 | 17 | 3 | 3 (Polka-dot) | 0.95 |
| 005 | 18 | 3 | 3 (Polka-dot) | 0.45 |
| 006 | 2 | 9 | 2 (Black) | 0.33 |
| 007 | 11 | 10 | 1 (Half-tone dot meshing) | 0.90 |
| 008 | 7 | 13 | 4 (Oblique line) | 0.75 |
| 009 | 6 | 14 | 4 (Oblique line) | 0.80 |
| 010 | 5 | 15 | 4 (Oblique line) | 0.90 |
| 011 | 17 | 17 | 1 (Half-tone dot meshing) | 0.95 |
| 012 | 6 | 19 | 2 (Black) | 0.40 |
| 013 | 8 | 19 | 1 (Half-tone dot meshing) | 0.90 |

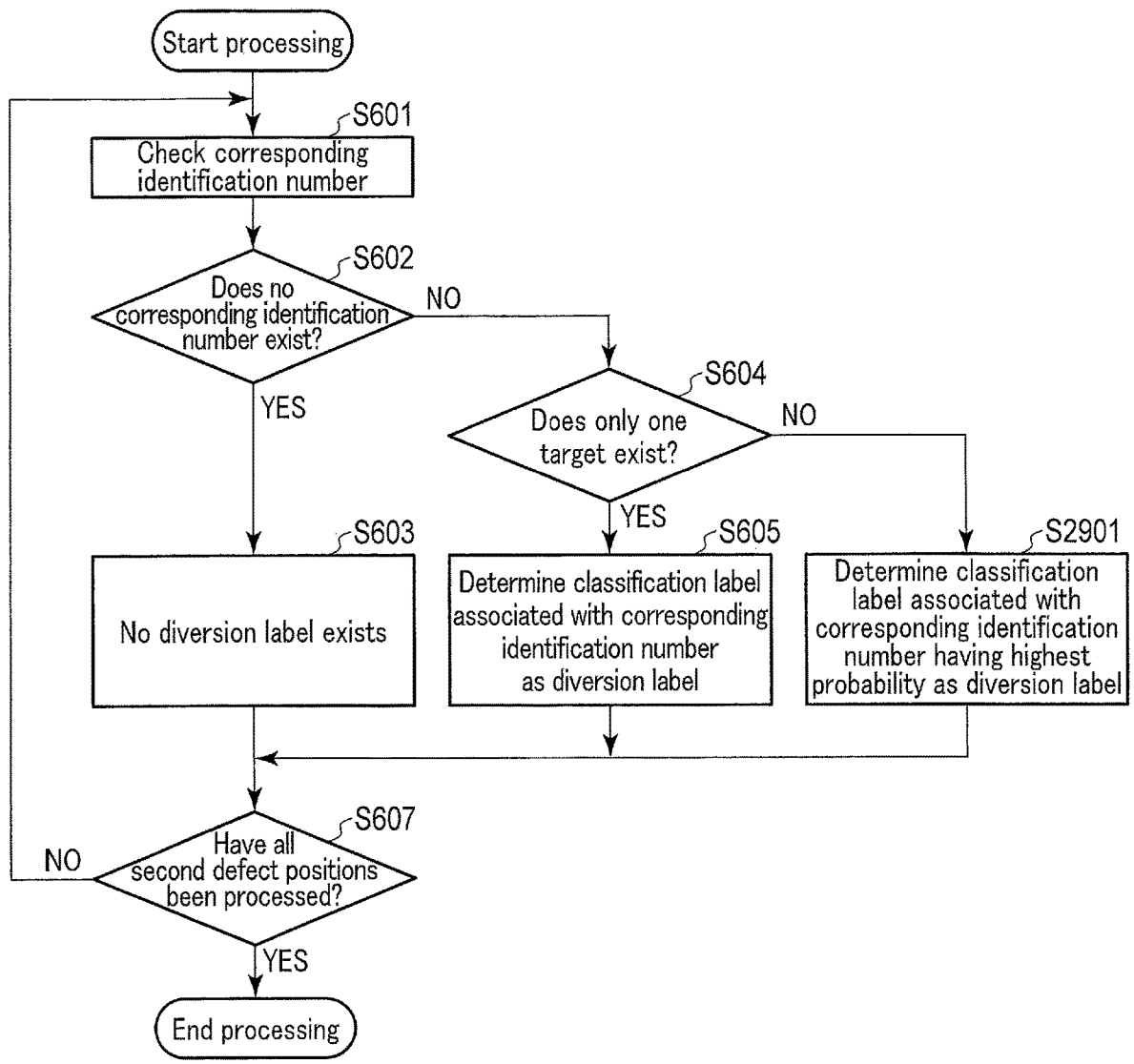
F I G. 29

| Identification number | X coordinate | Y coordinate | Classification label | Probability | Image data |
|---|---|---|---|---|---|
| 101 | 7 | 1 | 1 | 0.90 |  |
| 102 | 18 | 2 | 3 | 0.80 |  |
| 103 | 17 | 3 | 3 | 0.95 |  |
| 104 | 7 | 6 | --- | --- |  |
| 105 | 11 | 9 | 1 | 0.90 |  |
| 106 | 12 | 9 | 1 | 0.90 |  |
| 107 | 12 | 10 | 1 | 0.90 |  |
| 108 | 8 | 12 | 4 | 0.75 |  |
| 109 | 6 | 14 | 4 | 0.80 |  |
| 110 | 5 | 15 | 4 | 0.90 |  |
| 111 | 17 | 16 | 1 | 0.95 |  |
| 112 | 18 | 16 | 1 | 0.95 |  |
| 113 | 7 | 19 | 1 | 0.90 |  |

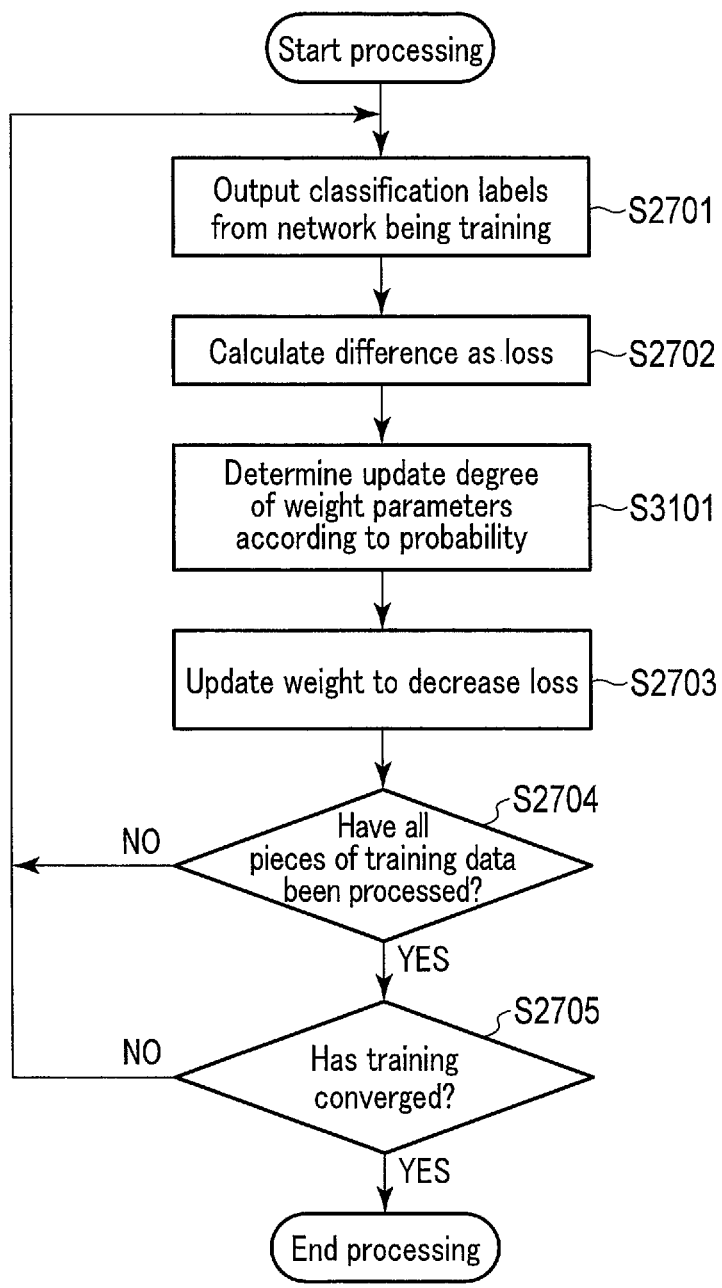
F I G. 31

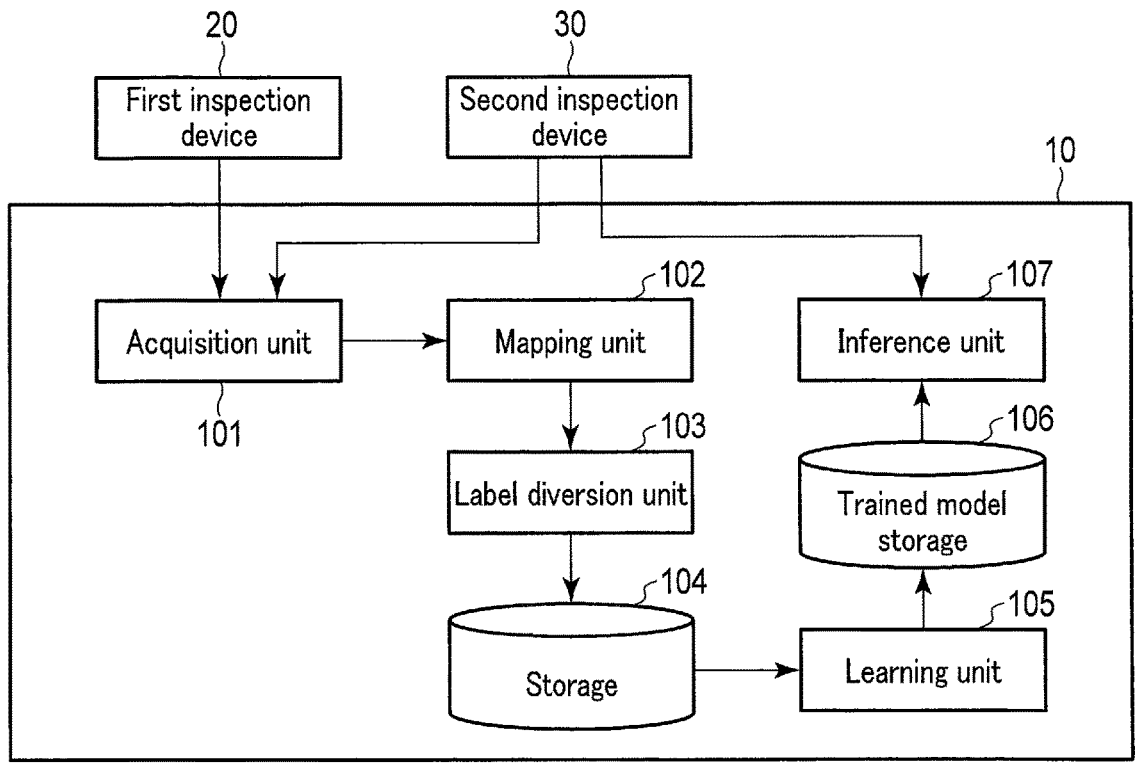
F I G. 33
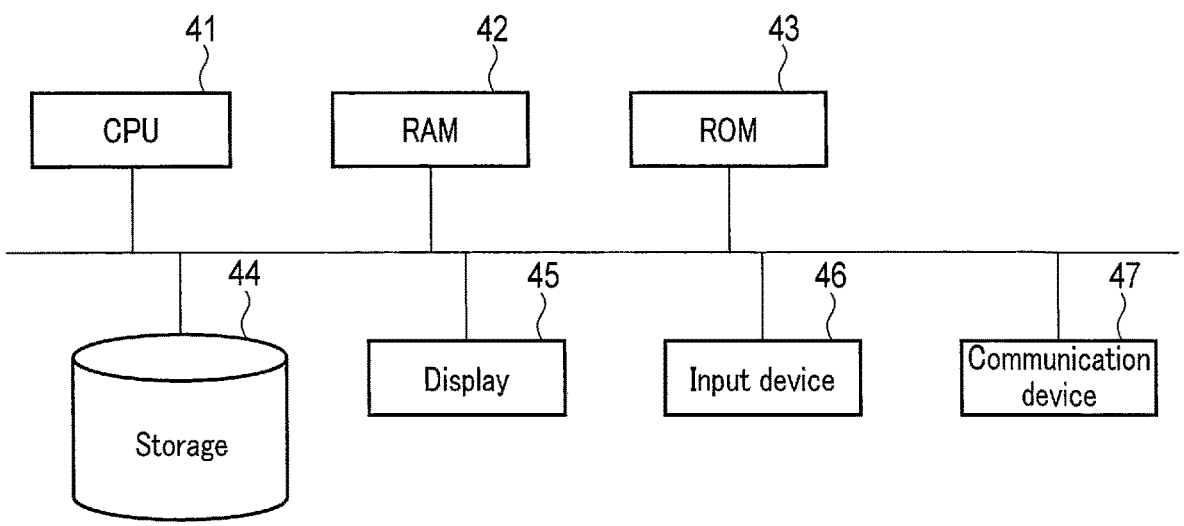
F I G. 34

DEFECT MANAGEMENT APPARATUS, METHOD AND NON-TRANSITORY COMPUTER READABLE MEDIUM

CROSS-REFERENCE TO RELATED APPLICATIONS

This application is based upon and claims the benefit of priority from Japanese Patent Application No. 2020-151405, filed Sep. 9, 2020, the entire contents of which are incorporated herein by reference.

FIELD

Embodiments described herein relate to a defect management apparatus, method and a non-transitory computer readable medium.

BACKGROUND

In a manufacturing processing for semiconductors or the like, defect management is important to accurately monitor the manufacturing quality and improve the yield. Because inspection data in defect management is enormous and the inspection items include many different items, the work of manually checking the inspection data is not easy. For this reason, in recent years, machine learning have been used in defect management, and classification models of determining the type of the defect from inspection images have attracted attention.

However, to prepare training data to train a classification model requires a teaching work of providing labels relating to classification of defects to images acquired by imaging defective regions of the product. Because the teaching work requires expertise and mainly depends on manpower, and it is not easy to prepare a large number of labels serving as correct data in machine learning.

BRIEF DESCRIPTION OF THE DRAWINGS

FIG. 1 is a block diagram illustrating a defect management system including a defect management apparatus according to a first embodiment;

FIG. 4 is a flowchart illustrating an operation example of a mapping unit according to the first embodiment;

FIG. 5 is a diagram illustrating an example of processing results with the mapping unit according to the first embodiment;

FIG. 7 is a diagram illustrating an example of processing results with the label diversion unit according to the first embodiment;

FIG. 8 is a diagram illustrating an example of data stored in a storage according to the first embodiment;

FIG. 10 is a flowchart illustrating an operation example of a mapping unit according to the second embodiment;

FIG. 11 is a diagram illustrating an example of processing results with the mapping unit according to the second embodiment;

FIG. 12 is a diagram illustrating an example of processing results with a label diversion unit according to the second embodiment;

FIG. 14 is a flowchart illustrating an operation example of a mapping unit according to the third embodiment;

FIG. 15 is a diagram illustrating an example of processing results with the mapping unit according to the third embodiment;

FIG. 16 is a diagram illustrating an example of processing results with a label diversion unit according to the third embodiment;

FIG. 17 is a diagram illustrating an example of influence ranges corresponding to classification labels according to a fourth embodiment;

FIG. 18 is a flowchart illustrating an operation example of a mapping unit according to the fourth embodiment;

FIG. 19 is a diagram illustrating an example of processing results with the mapping unit according to the fourth embodiment;

FIG. 20 is a diagram illustrating an example of processing results with a label diversion unit according to the fourth embodiment;

FIG. 23 is a diagram illustrating an example of a co-occurrence table according to the fifth embodiment;

FIG. 24 is a diagram illustrating an example of processing results with the mapping unit according to the fifth embodiment;

FIG. 25 is a diagram illustrating an example of processing results with a label diversion unit according to the fifth embodiment;

FIG. 26 is a block diagram illustrating a defect management apparatus according to a sixth embodiment;

FIG. 29 is a flowchart illustrating an operation of a label diversion unit according to the seventh embodiment;

FIG. 31 is a flowchart illustrating training processing with a learning unit of a defect management apparatus according to the seventh embodiment;

FIG. 33 is a block diagram illustrating a defect management apparatus according to a ninth embodiment; and FIG. 34 is a diagram illustrating an example of hardware configuration of the defect management apparatus.

DETAILED DESCRIPTION

Figure 2:
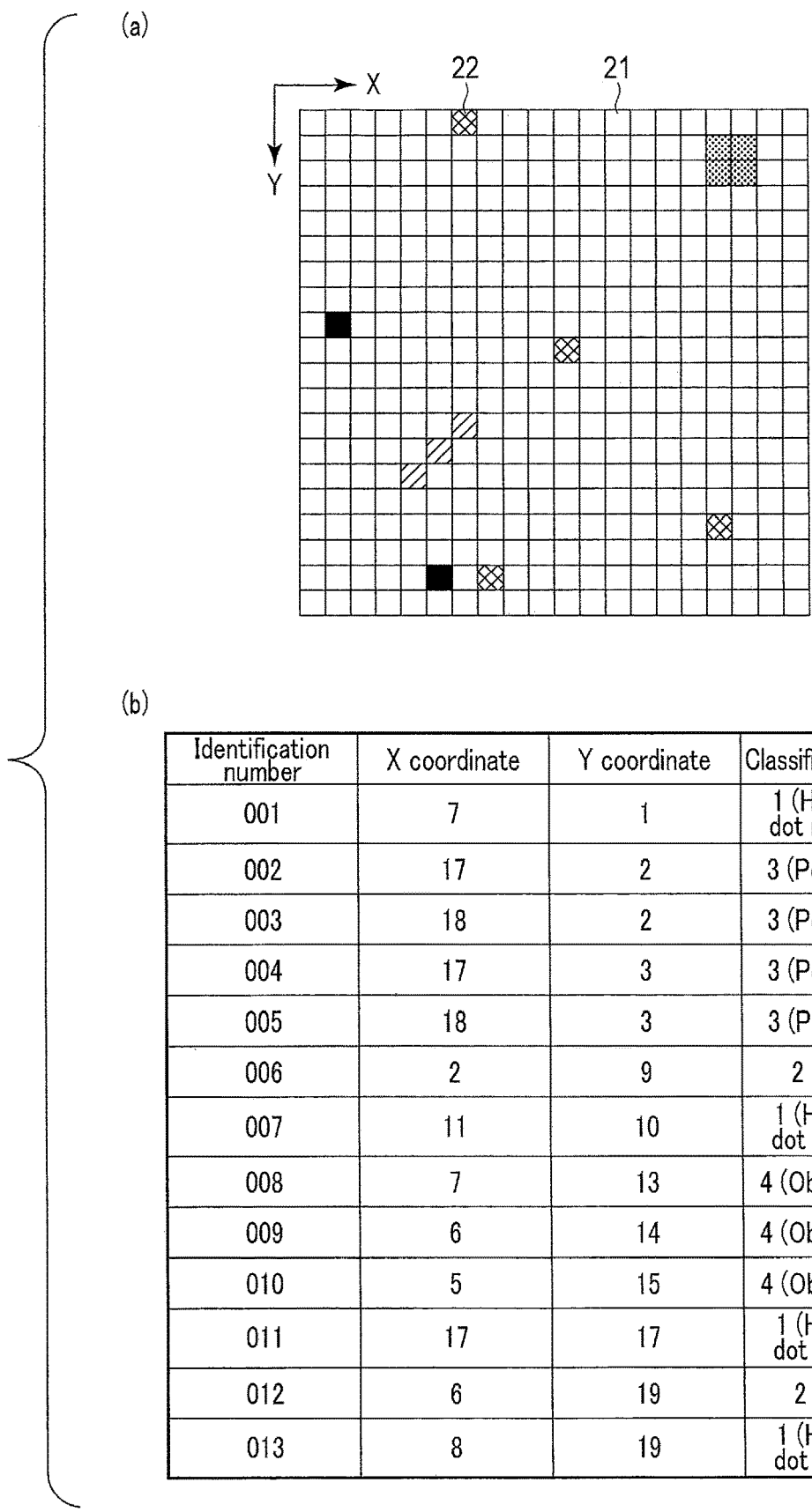
FIG. 2 is a diagram illustrating an example of first inspection information acquired with a first inspection device according to the first embodiment.

In general, according to one embodiment, a defect management apparatus includes a processor. The processor acquires first inspection information and second inspection information, the first inspection information including first defect positions relating to defects detected with a first inspection device for an inspection target and corresponding first classification labels indicating classifications of the defects, the second inspection information including second defect positions relating to defects detected with a second inspection device different from the first inspection device for the inspection target.

The processor determines a first defect position corresponding to a second defect position as a corresponding defect position, based on the first inspection information and the second inspection information. The processor diverts the first classification label corresponding to the corresponding defect position as a second classification label of the second defect position.

In defect management, it is important to detect defective products without omission, and immediately identify the cause of occurrence of the defect. For this reason, a defect inspection apparatus or a defect review apparatus is used for defect management, and analysis of inspection data output with the apparatus, such as inspection results and captured images, is used for defectiveness detection and identification of the cause.

In recent years, because products to be manufactured are complicated, the necessity for execution of defect inspection has increased in a plurality of processes, such as reception of the manufacturing material, a manufacturing process serving as a turning point, and a step directly before shipping. However, when the number of manufacturing products and the number of types of manufacturing products are enormous and the inspection process includes many different items, the work of checking the inspection data by manpower is not easy. For this reason, defect management by machine learning is greatly expected as a labor-saving technique for the inspection work by automatically determining the type of the defect and/or presence/absence of defectiveness.

However, difficulty exists in preparation of a large number of labels as described above. In addition, in the site in which a large number of products are manufactured, it is required to sacrifice the resolution having a trade-off relation with the inspection time, because of the constraint of manufacturing TAT (Turn Around Time). This decreases the resolution of the inspection image, and causes the situation in which difficulty exists in accurately teaching the type of the defect by the operator's visual observation. In addition, in the step during manufacturing, it is impossible to recognize whether or not the defect leads to defectiveness to be determined in the end, and difficulty exists in preparation of an ideal classification system.

The present embodiment described hereinafter enables reduction in labor of teaching necessary for model construction, and enables easy generation of proper labels.

A defect management apparatus, method and a non-transitory computer readable medium according to the present embodiment will now be described in detail hereinafter. In the following embodiments, elements with the same reference numerals execute the same operations, and an overlapping explanation thereof will be omitted.

First Embodiment

A defect management system including a defect management apparatus according to a first embodiment will be explained hereinafter with reference to a block diagram of FIG. 1.

A defect management system 1 according to the first embodiment includes a defect management apparatus 10, a first inspection device 20, and a second inspection device 30.

The first inspection device 20 images an inspection target and acquires a first inspection image of the inspection target. The first inspection device 20 inspects the first inspection image and generates first inspection information relating to the inspection target. The first inspection information includes information as to whether or not any defect occurs on the basis of inspection of the first inspection device 20 and, when any defect occurs, information of a first defection position indicating a position of the defect and a classification label relating to the type of the defect.

The second inspection device 30 executes inspection different from that of the first inspection device 20. The second inspection device 30 images the inspection target and acquires a second inspection image of the inspection target. The second inspection device 30 inspects the second inspection image and generates second inspection information relating to the inspection target. The second inspection information includes information as to whether or not any defect occurs on the basis of inspection of the second inspection device 30 and, when any defect occurs, information of a second defection position indicating a position of the defect.

The defect management apparatus 10 includes an acquisition unit 101, a mapping unit 102, a label diversion unit 103, and a storage 104.

The acquisition unit 101 acquires the first inspection information including the first defect position relating to the defect detected with the first inspection device 20 with respect to the inspection target and the corresponding first classification label from the first inspection device 20. The acquisition unit 101 also acquires the second inspection information including the second defect position relating to the defect detected with the second inspection device 30 with respect to the same inspection target from the second inspection device 30.

The mapping unit 102 receives the first inspection information and the second inspection information from the acquisition unit 101, and determines the first defect position corresponding to the second defect position as a corresponding defect position on the basis of the first inspection information and the second inspection information.

The label diversion unit 103 receives information relating to the second defect position and the corresponding defect position and the first inspection information from the mapping unit 102 and, with reference to the first inspection information, diverts the first classification label corresponding to the corresponding defect position as a second classification label of the second classification position. In other words, the label diversion unit 103 provides the first classification label corresponding to the corresponding defect position to the second defect position as the second classification label.

The storage 104 receives the second defect position and the second classification label from the label diversion unit 103, and stores therein the second defect position and the second classification label in association with each other. The storage 104 may store therein the second inspection information and the second classification label in association with each other. The storage 104 may acquire the second inspection information from the acquisition unit 101 to store therein, or directly acquire the second inspection information from the second inspection device 30 to store therein. As another example, the storage 104 may acquire and store therein the first inspection information in the same manner as the second inspection information.

The following is an explanation of a specific example of the first inspection information acquired with the first inspection device 20 with reference to FIG. 2.

Figure 21:
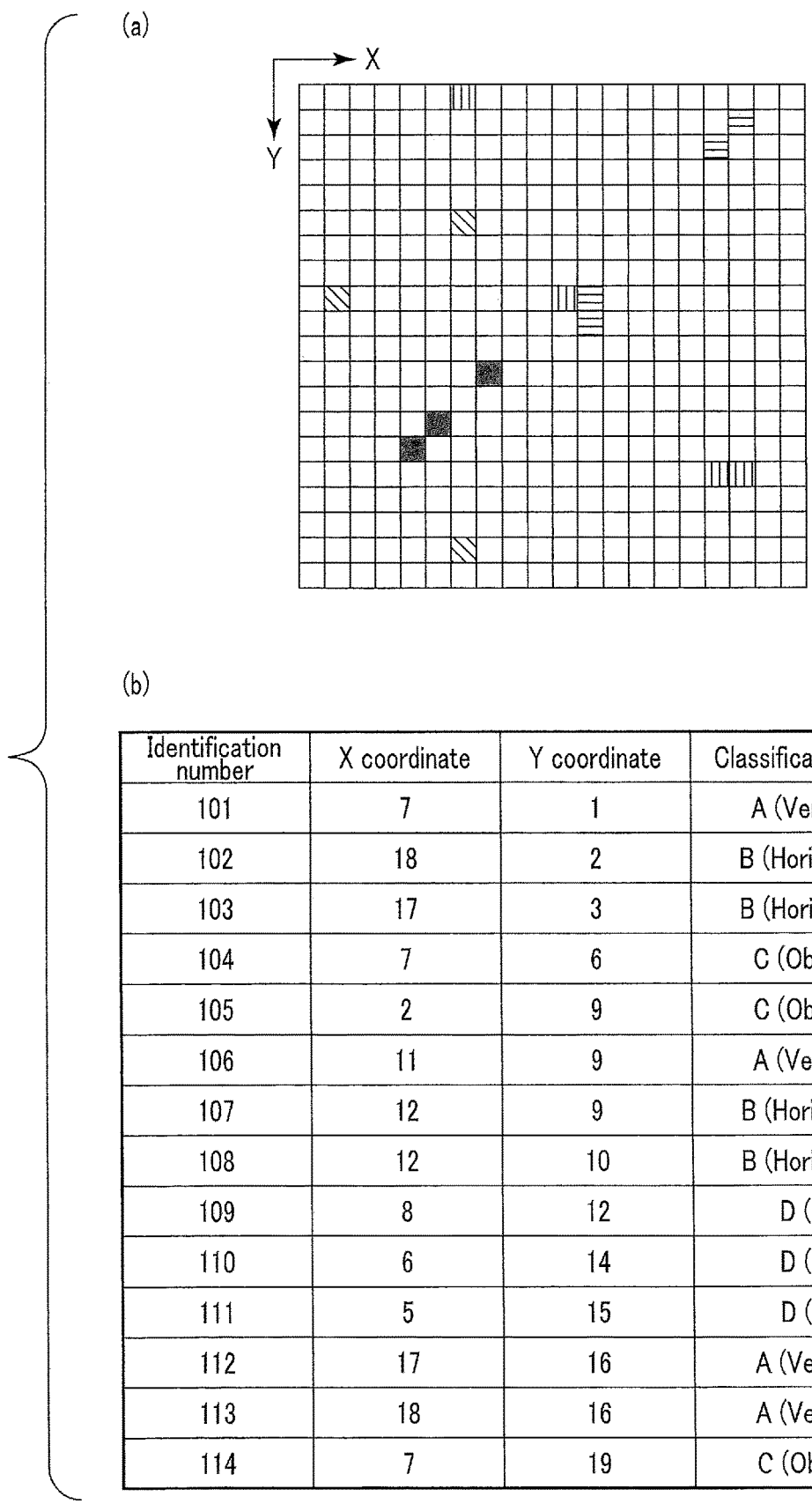
FIG. 21 is a diagram illustrating an example of second inspection information acquired with a second inspection device according to a fifth embodiment.

FIG. 2 (a) is a schematic diagram illustrating a first inspection image of a product serving as the inspection target imaged with the first inspection device 20. The product serving as the inspection target is supposed to have a square shape in this example. An inspection region 21 is a partial image region in the case where the product serving as the inspection target is imaged with the resolution with which the product is divided into 20 parts in each of length and breadth. For the sake convenience of explanation, each of 20×20 coordinates are defined in an XY plane in which the left top coordinates are set to (1, 1), and one coordinates designated with the X coordinate and the Y coordinate indicate one inspection region 21. Presence/absence of a defect is inspected for each of the inspection regions 21. In FIG. 21 (a), an inspection region 21 in which a pattern is drawn indicates an inspection region including a defect, and the inspection region 21 is also referred to as "first defect position 22". In the example of FIG. 2 (a), 13 first defect positions 22 exist. The types of hatching express classification labels indicating the types of the defect. For example, a half-tone dot meshing pattern indicates mixing of a foreign substance, a single-color fill pattern indicates a hole, an oblique-line pattern indicates a scratch, and a polka-dot pattern indicates a stain, to express the classification labels.

FIG. 2 (b) is a first inspection information table in which the first defect positions 22 illustrated in FIG. 2 (a) are extracted. The table illustrated in FIG. 2 (b) associates the identification number, the coordinates (X coordinate, Y coordinate) of the first defect position 22, and the classification label indicating the type of the defect existing in the first defect position 22 with each other. Specifically, as the identification number "001", the X coordinate "7" and the Y coordinate "1" of the defect position and the classification label "1 ("half-tone dot meshing")" are associated with each other, and stored in the table. For the sake of convenience of explanation, to illustrate correspondence with FIG. 2 (a), the type of the pattern indicating the defect position, such as the half-tone dot meshing pattern and the polka-dot pattern, is also illustrated as information of the classification label, but information relating to the type of the pattern of the classification label is not necessarily included in the first inspection information.

The first inspection information table is retained in the first inspection device 20 or the like and acquired with the acquisition unit 101 of the defect management apparatus 10 from the first inspection device 20. The first inspection information table may be stored in the storage 104 after acquired with the acquisition unit 101.

Figure 3:
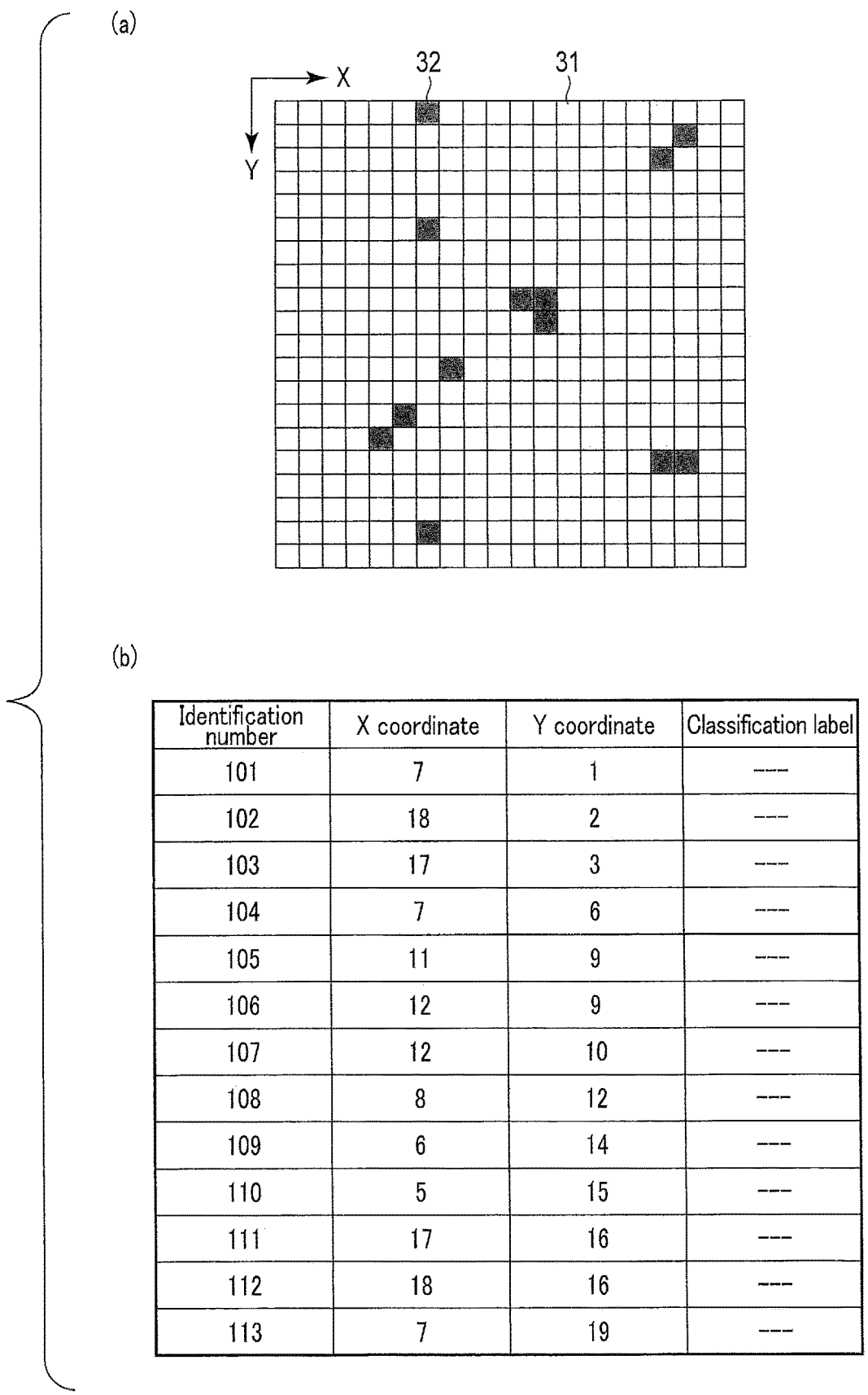
FIG. 3 is a diagram illustrating an example of second inspection information acquired by a second inspection device according to the first embodiment.

The following is an explanation of a specific example of the second inspection information acquired with the second inspection device 30 with reference to FIG. 3.

FIG. 3 (a) is a schematic diagram illustrating inspection regions 31 in the case where the second inspection device 30 images the product serving as the inspection target and imaged with the first inspection device 20.

In the first embodiment, suppose that the same product is imaged with the same resolution as that of the first inspection device 20, and coordinates express 20×20 inspection regions 31. Because the first inspection device 20 and the second inspection device 30 have different imaging systems, acquired inspection images of them are different. In the same manner as the first inspection device 20, the second inspection device 30 inspects presence/absence of a defect for each of the inspection regions 31. In the example of FIG. 3 (a), suppose that 13 second defect positions 32 exist.

FIG. 3 (b) is a second inspection information table in which the second defect positions 32 are extracted, in the same manner as FIG. 2 (b). In this example, because the second inspection device 30 is supposed to provide no classification labels, the item of the classification label has blanks. The table illustrated in FIG. 3 (b) associates the identification number with the coordinates (X coordinate, Y coordinate) of the second defect position 32. In the same manner as the first inspection information, the second inspection information is retained in the second inspection device 30 or the like and acquired with the acquisition unit 101 of the defect management apparatus 10 from the second inspection device 30. The second inspection information table may be stored in the storage 104 after acquired with the acquisition unit 101.

The following is an explanation of an operation example of the mapping unit 102 of the defect management apparatus 10 according to the first embodiment with reference to a flowchart of FIG. 4.

At Step S401, the mapping unit 102 acquires an unprocessed second defect position in the second defect positions included in the second inspection information.

At Step S402, the mapping unit 102 acquires a first defect position closest to the second defect position, in the first defect positions included in the first inspection information. Specifically, the mapping unit 102 superimpose the first inspection image and the second inspection image by positioning them with the common coordinate axes to map the first defect positions and the second defect positions on the same plane. Thereafter, the mapping unit 102 selects the first defect position having the shortest Euclidean distance between the second defect position and the first defect position. When the FIG. 2 (a) and the FIG. 3 (a) are used as an example, the first inspection image and the second inspection image are superimposed to acquire the first defect position closest to the second defect position serving as the processing target. When a plurality of first defect positions closest to the second defect position serving as the processing target exist, the plurality of first defect positions are acquired.

At Step S403, the mapping unit 102 determines whether or not the distance between the first defect position and the second defect position is equal to or larger than the threshold, that is, whether or not the first defect position and the second defect position do not exist within a predetermined range. The threshold is, for example, a Euclidean distance between coordinates. When the distance between the first defect position and the second defect position is equal to or larger than the threshold, it is determined that they do not exist within the predetermined range. By contrast, when the distance between the first defect position and the second defect position is smaller than the threshold, it is determined that they exist within the predetermined range. When the distance between the first defect position and the second defect position is equal to or larger than the threshold, the process proceeds to Step S404. When the distance between the first defect position and the second defect position is smaller than the threshold, the process proceeds to Step S405.

At Step S404, the mapping unit 102 determines that no corresponding defect position exists.

At Step S405, the mapping unit 102 determines whether or not only one first defect position exists within the predetermined range. When only one first defect position exists within the predetermined range, the process proceeds to Step S406. When a plurality of first defect positions exist within the predetermined range, the process proceeds to Step S407.

At Step S406, the mapping unit 102 determines the corresponding first defect position as the corresponding defect position.

At Step S407, the mapping unit 102 determines the corresponding first defect positions as the corresponding defect positions.

At Step S408, it is determined whether or not all the second defect positions have been processed. When all the second defect positions have not been processed, that is, when any unprocessed second defect position exists, the process returns to Step S401, and the same processing is repeated. By contrast, when all the second defect positions have been processed, the process with the mapping unit 102 is ended.

The following is an explanation of an example of processing results with the mapping unit 102 according to the first embodiment with reference to FIG. 5.

FIG. 5 illustrates a table illustrating first defect positions for the second defect positions and illustrating processing results for the defect positions illustrated in FIG. 2 and FIG. 3. For the sake of convenience of explanation, the example of FIG. 5 illustrates correspondence between the identification numbers of the second defect positions included in the second inspection information and the identification numbers (also referred to as "corresponding identification numbers") of the first defect positions (corresponding defect positions). The structure is not limited thereto, but the coordinate information (X coordinate, Y coordinate) of each of the second defect positions may be associated with the coordinate information (X coordinate, Y coordinate) of the corresponding defect position. Referring to the table illustrated in FIG. 5 enables recognition of the correspondence of the defect positions between the first inspection information and the second inspection information.

Specifically, suppose that processing is executed for the second defect position with the identification number "101" illustrated in FIG. 3 (b), that is, the second defect position having the coordinate information "(X=7, Y=1)". In the following explanation, the coordinates are simply expressed as "(X, Y)". The first defect position (7, 1) with the identification number "001" is acquired as the first defect position closest to the second defect position with the identification number "101". In this example, when the threshold is the Euclidean distance "2", because the first defect position and the second defect position exist in the same coordinates, the Euclidean distance thereof is "0", and it is determined that the first defect position and the second defect position exist within the predetermined range. For this reason, the mapping unit 102 determines that the first defect position with the identification number "001" is the corresponding defect position of the second defect position with the identification number "101". In FIG. 5, the identification number "101" of the second defect position is associated with the corresponding identification number "001" of the corresponding defect position.

Thereafter, suppose that processing is executed for the second defect position (7, 6) with the identification number "104". The first defect position (7, 1) with the identification number "001" is acquired as the first defect position closest to the second defect position with the identification number "104". However, the Euclidean distance between the first defect position and the second defect position is "5", and the Euclidean distance is larger than the threshold "2". For this reason, because the first defect position and the second defect position do not exist within the predetermined range, it is determined that no corresponding first defect position exists for the second defect position with the identification number "104". In FIG. 5, the corresponding identification number corresponding to the identification number "104" is blank.

Thereafter, suppose that processing is executed for the second defect position (7, 19) with the identification number "113". A plurality of first defect positions exist as the first defect positions closest to the second defect position with the identification number "101", and the first defect position (6, 19) with the identification number "012" and the first defect position (8, 19) with the identification number "013" are acquired. The distance between the second defect position and each of the two first defect positions is a Euclidean distance "1", and the Euclidean distance is smaller than the threshold "2". For this reason, it is determined that the two first defect positions and the second defect position exist within the predetermined range. Accordingly, the two first defect positions with the identification numbers "012" and "013" are determined as the corresponding defect positions for the second defect position with the identification number "113". In FIG. 5, the identification number "113" of the second defect position is associated with the corresponding identification numbers "012" and "013" of the corresponding defect positions.

Figure 6:
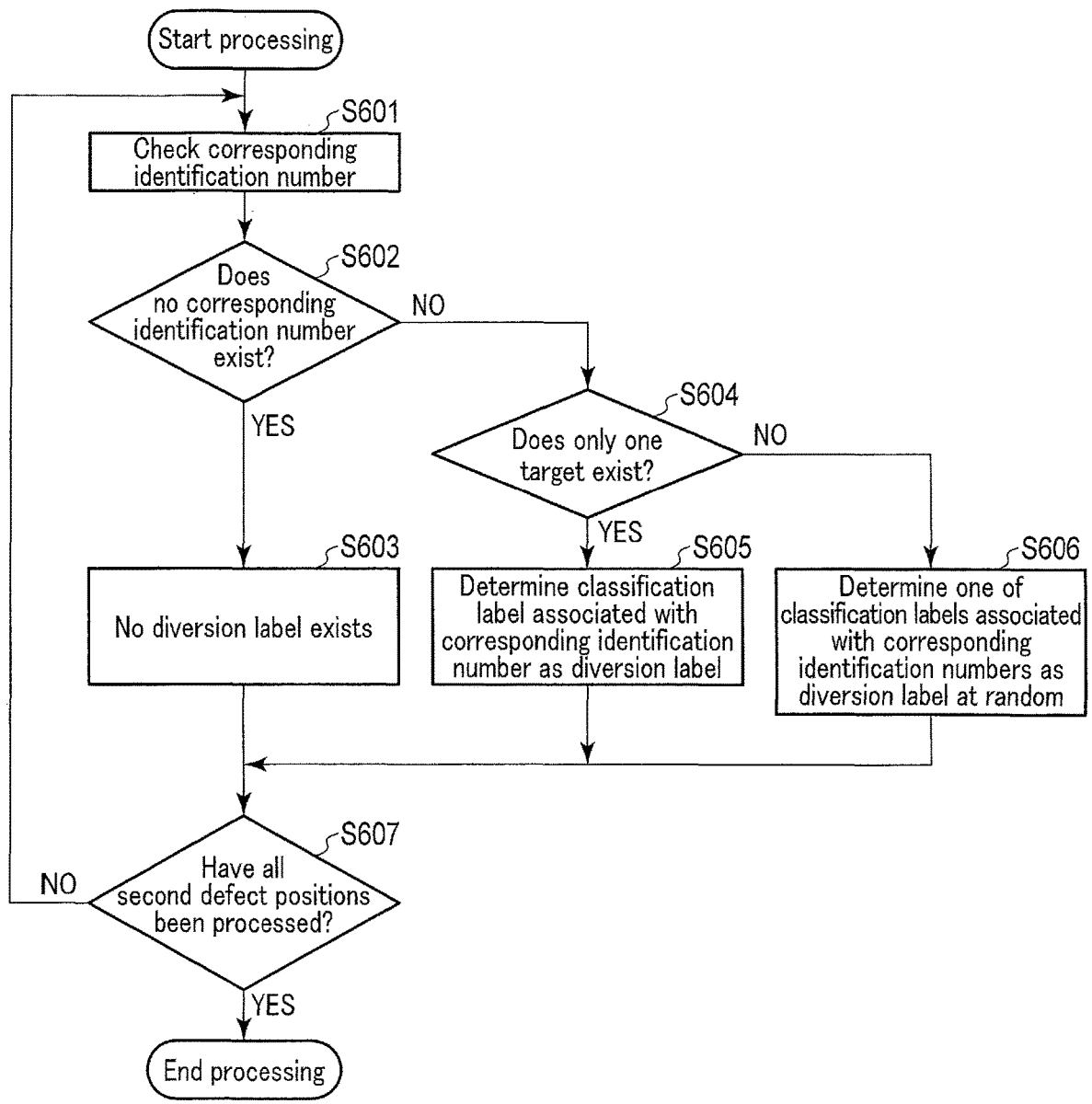
FIG. 6 is a flowchart illustrating an operation example of a label diversion unit according to the first embodiment.

The following is an explanation of an operation example of the label diversion unit 103 of the defect management apparatus 10 according to the first embodiment with reference to FIG. 6.

At Step S601, the label diversion unit 103 checks the corresponding identification number corresponding to an unprocessed second defect position in the processing results acquired with the mapping unit 102.

At Step S602, the label diversion unit 103 determines whether or not any corresponding identification number exists. When no corresponding identification number exists, the process proceeds to Step S603. When any corresponding identification number exists, the process proceeds to Step S604.

At Step S603, the label diversion unit 103 determines that no diversion label exists, because no corresponding identification number exists.

At Step S604, the label diversion unit 103 determines whether or not only one corresponding identification number exists or a plurality of corresponding identification numbers exist. When only one corresponding identification number exists, the process proceeds to Step S605. When a plurality of corresponding identification numbers exist, the process proceeds to Step S606.

At Step S605, the label diversion unit 103 extracts the classification label of the first defect position associated with the corresponding identification number from the first inspection information, and determines the extracted classification label as the diversion label.

At Step S606, the label diversion unit 103 extracts the classification labels of the first defect positions associated with the corresponding identification numbers from the first inspection information, selects one of the classification labels at random, and determines the selected classification label as the diversion label. The label diversion unit 103 may determine a plurality of types of labels in the classification labels as the diversion labels.

At Step S607, the label diversion unit 103 determines whether or not all the second defect positions have been processed. When all the second defect positions have not been processed, that is, when any unprocessed second defect position exists, the process returns to Step S601, and the same processing is repeated. By contrast, when all the second defect positions have been processed, the process with the label diversion unit 103 is ended.

The following is an explanation of an example of processing results with the label diversion unit 103 according to the first embodiment with reference to FIG. 7.

FIG. 7 illustrates processing results acquired by adding the item of the diversion label to the table of FIG. 5. Specifically, it is recognized that the classification label of the corresponding identification number "001" corresponding to the second defect position "101" is the classification label "1" by referring to the first inspection information of FIG. 2. For this reason, the classification label of the second defect position "101" is determined as "1".

By contrast, because no corresponding identification number corresponding to the second defect position "104" exists, no diversion label is assigned to the second defect position "104".

In addition, it is recognized that the classification labels of the corresponding identification numbers "012" and "013" corresponding to the second defect position "113" are the classification labels "2" and "1" by referring to the first inspection information of FIG. 2. In this example, it is supposed that the classification label "2" is selected by random selection, and the diversion label corresponding to the second defect position "113" is determined as "2".

When a plurality of types of labels are determined as the diversion labels, the diversion labels corresponding to the second defect position "113" may be determined as "1, 2".

The following is an explanation of an example of data stored in the storage 104 with reference to FIG. 8.

FIG. 8 illustrates a table illustrating updated second inspection information, and an example acquired by adding the data items of the diversion label and the image data to the table of FIG. 3 (b).

As illustrated in FIG. 8, the classification labels associated with the corresponding defect positions are associated as the diversion labels with the respective second defect positions, and partial images of the inspection images corresponding to the respective second defect positions are also associated.

According to the first embodiment described above, on the basis of the defect position of the second inspection information in which the type of the defect is not distinguished, the classification label relating to the type of the defect provided in the first inspection information acquired by inspection with the first inspection device is diverted as the classification label of the second defect position. This structure enables automatic generation of a proper classification label even when the label is a classification label difficult to provide with the second inspection device, and enables labor saving for the manual classification work. Specifically, this structure enables easy preparation of proper labels.

Second Embodiment

The first embodiment illustrates the case where the same resolution is used in imaging of the product serving as the inspection target with the first inspection device and the second inspection device. The second embodiment is supposed to be applied to the case where the first inspection device and the second inspection device use different resolutions in imaging.

For example, because the appearance inspection is required to find minute anomalies, high resolution in imaging is preferred in the appearance inspection. By contrast, the functional inspection is inspection to determine whether or not the product fulfills the function as the product, and there are cases where minute scratches and/or foreign substances are not determined as anomaly when they occur in parts causing no problem in fulfillment of the function. For this reason, there are cases where the resolution in the functional inspection is set lower than that in the appearance inspection. As described above, the resolution may differ when the purposes of the inspection are different.

The configuration of the defect management apparatus 10 is the same as that in the first embodiment, and an explanation thereof herein is omitted.

A specific example of first inspection information acquired with a first inspection device 20 according to the second embodiment will be explained with reference to FIG. 9. Suppose that second inspection information acquired with a second inspection device 30 is the same as that in the first embodiment.

Figure 9:
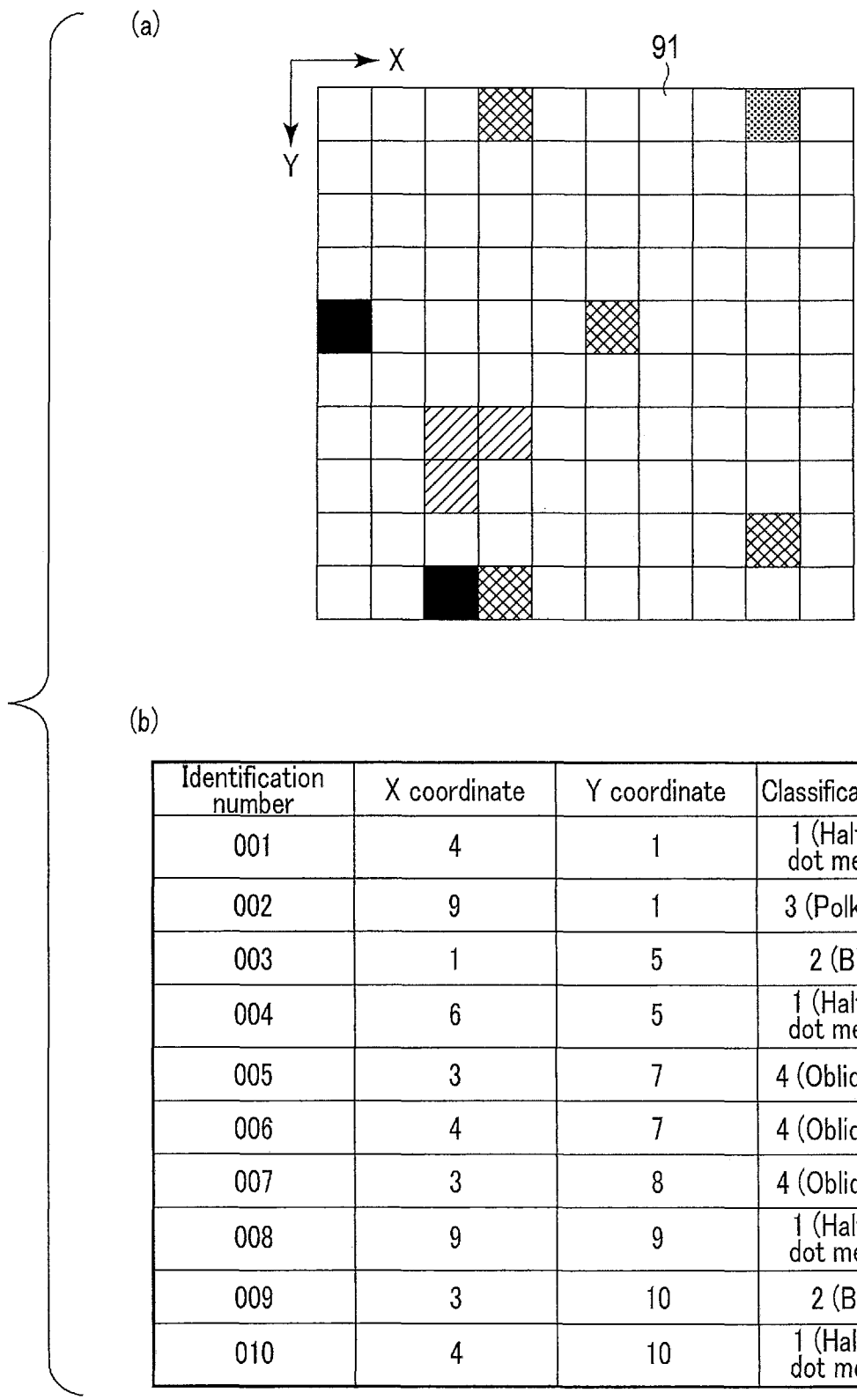
FIG. 9 is a diagram illustrating an example of first inspection information acquired with a first inspection device according to a second embodiment.

FIG. 9 (a) is a schematic diagram illustrating a first inspection image of the product serving as the inspection target imaged with the first inspection device 20, in the same manner as FIG. 2 (a). FIG. 9 (b) illustrates a table in which coordinate information of defect positions 22 in FIG. 9 (a) are extracted, in the same manner as FIG. 2 (b).

The first inspection image illustrated in FIG. 9 illustrates the case where imaging is executed with the resolution in which the image is divided into 10 parts in each of length and breadth. Specifically, 100 coordinates of 10×10 size are defined, and each pair of coordinates indicates an inspection region 91. Except that the resolution is different, the structure is the same as the case of FIG. 2, and an explanation thereof is omitted.

The following is an explanation of an operation example of the mapping unit 102 according to the second embodiment with reference to a flowchart of FIG. 10.

Step S401 and Step S402 are the same processing steps as those in FIG. 4. At Steps S401 and S402, the first defect position closest to the unprocessed second defect position is acquired.

At Step S1001, the mapping unit 102 determines whether or not the second defect position is included in the first defect position. Specifically, because the first defect position has lower resolution than that of the second defect image, the pixel size expressed in the first defect position is larger than the pixel size expressed in the second defect position. For this reason, the mapping unit 102 positions the first inspection image and the second inspection image with the same coordinate axes, and superimposes the first and the second inspection images to map the first defect position and the second defect position on the same plane. Thereafter, the mapping unit 102 determines whether or not the second defect position is included in the first defect position. When the second defect position is included in the first defect position, the process proceeds to Step S1002. When the second defect position is not included in the first defect position, the process proceeds to Step S1003.

With a certain relation of the resolution between the first inspection image and the second inspection image, there are cases where the second defect position is not entirely included in the first defect position but only part of the second defect position is included in the first defect position. In this case, it suffices that the mapping unit 102 determines whether or not at least part of the second defect position is included in the first defect position. When at least part of the second defect position is included in the first defect position, the process proceeds to Step S1002. When the second defect position is not included in the first defect position, the process proceeds to Step S1003.

At Step S1002, the mapping unit 102 determines that no corresponding defect position exists.

At Step S1003, the mapping unit 102 determines the first defect position including the second defect position as the corresponding defect position.

At Step S1004, the mapping unit 102 determines whether or not all the second defect positions have been processed. When all the second defect positions have not been processed, that is, when any unprocessed second defect position exists, the process returns to Step S1001, and the same processing is repeated. By contrast, when all the second defect positions have been processed, the process with the mapping unit 102 is ended.

The following is an explanation of an example of processing results with the mapping unit 102 according to the second embodiment with reference to FIG. 11.

FIG. 11 illustrates a table illustrating the first defect positions corresponding to the second defect positions, in the same manner as FIG. 5. The example of FIG. 11 illustrates correspondence between the identification numbers of the second defect positions included in the second inspection information and the identification numbers of the first defect positions.

Specifically, for example, when the first defect position (X=6, Y=5) with the identification number "004" illustrated in FIG. 9 (b) is expressed to agree with the resolution of the second inspection device 20, because the first defect position corresponds to a size twice in length and breadth as large as the pixel size of the second inspection image, the first defect position corresponds to four coordinates (11, 9), (11, 10), (12, 9), and (12, 10). For this reason, the three second defect positions with the identification number "105" (11, 9), the identification number "106" (12, 9), and the identification number "107" (12, 10) are included in the first defect position. Accordingly, the first defect position with the corresponding identification number "004" is associated with the second defect positions with the identification numbers "105" to "107", as the corresponding defect position.

FIG. 12 illustrates an example of processing results with the label diversion unit 103 according to the second embodiment.

The operations executed with the label diversion unit 103 are the same as the operations of the label diversion unit 103 illustrated in FIG. 6 according to the first embodiment.

As illustrated in FIG. 12, the label diversion unit 103 associates the classification labels of the first inspection device corresponding to the corresponding identification numbers with the second defect positions, as the diversion labels.

According to the second embodiment described above, for example, the classification labels of the first inspection device having low resolution in inspection but capable of providing detailed classification labels are diverted as diversion labels to the defect positions of the second inspection device having higher resolution than that of the first inspection device and capable of determining only presence/absence of the defect at high speed. This structure enables automatic generation of classification labels, in the same manner as the first embodiment. This structure enables labor saving for the manual classification work, and is expected to achieve the effect of application to determination of the quality of the product.

Third Embodiment

The third embodiment is supposed to be applied to the case where first inspection information acquired with the first inspection device is provided with classification labels, and second inspection information acquired with the second inspection device is also provided with auxiliary labels indicating the probability of the detected defect.

The configuration of the defect management apparatus 10 is the same as that in the first embodiment, and an explanation thereof herein is omitted.

A specific example of second inspection information acquired with a second inspection device 30 according to the third embodiment will be explained with reference to FIG. 13. Suppose that first inspection information acquired with a first inspection device 20 is the same as that in the first embodiment.

Figure 13:
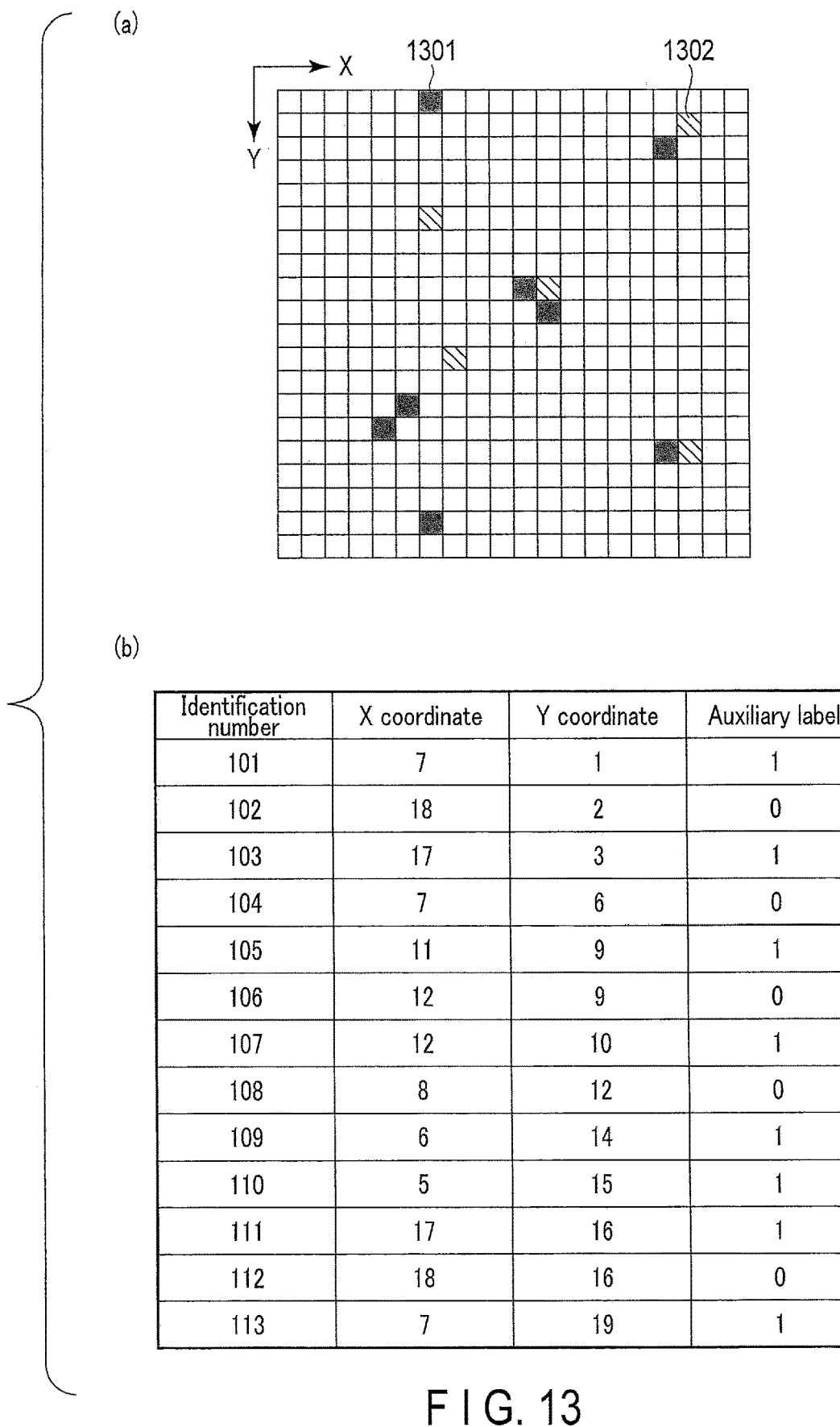
FIG. 13 is a diagram illustrating an example of second inspection information acquired with a second inspection device according to a third embodiment.

FIG. 13 (a) is a schematic diagram illustrating a second inspection image relating to the product serving as the inspection target imaged with the second inspection device 30, in the same manner as FIG. 3 (a).

In the second inspection image illustrated in FIG. 13 (a), second defect positions are classified and expressed according to the probability of the defect. A true defect 1301 with high defect probability is expressed with a single-color fill pattern, and a pseudo defect 1302 with defect probability lower than that of the true defect 1301 is expressed with an oblique-line pattern. Specifically, the defect in the second defect position (7, 1) is a true defect 1301, and the defect in the second defect position (18, 2) is a pseudo defect 1302.

FIG. 13 (b) illustrates a second inspection information table in which the second defect positions 32 in FIG. 13 (a) are extracted, in the same manner as FIG. 3 (b). The table illustrated in FIG. 13 (b) associates the identification number, the defect position (X coordinate, Y coordinate), and the auxiliary label. In the example of FIG. 13 (b), a true defect is set to the auxiliary label "1", and a pseudo defect is set to the auxiliary label "0".

The following is an explanation of an operation example of the mapping unit 102 according to the third embodiment with reference to a flowchart of FIG. 14.

At Step S1401, the mapping unit 102 acquires an unprocessed defect position and a corresponding auxiliary label from the second inspection information.

At Step S1402, the mapping unit 102 determines whether or not the auxiliary label of the second defect position indicates a pseudo defect. When the auxiliary label indicates a pseudo defect, the process proceeds to Step S1403. When the auxiliary label indicates a defect not being a pseudo defect, that is, when the auxiliary label indicates a true defect in the third embodiment, the process proceeds to Step S402.

At Step S1403, the mapping unit 102 determines that no corresponding defect exists, and the process proceeds to Step S408.

The processing from Step S402 to Step S408 is the same as that in FIG. 4, and an explanation thereof herein is omitted.

The following is an explanation of an example of processing results with the mapping unit 102 according to the third embodiment with reference to FIG. 15.

FIG. 15 illustrates processing results for the first defect positions in FIG. 2 and the second defect positions in FIG. 13, and illustrates a table illustrating correspondence between the identification numbers of the second defect positions and the corresponding identification numbers.

Specifically, because the second defect position (7, 1) with the identification number "101" illustrated in FIG. 13 has the auxiliary label "1", the second defect position (7, 1) is determined as a true defect at Step S1402 described above, and the first defect position (7, 1) having the identification number "001" and having the Euclidean distance smaller than the threshold is determined as the corresponding defect position thereof.

By contrast, because the second defect position (18, 2) with the identification number "102" illustrated in FIG. 13 has the auxiliary label "0", the second defect position (18, 2) is determined as a pseudo defect at Step S1402 described above, and associated with no first defect position.

FIG. 16 illustrates an example of processing results with the label diversion unit 103 according to the third embodiment.

The operations of the label diversion unit 103 are the same as the operations of the label diversion unit illustrated in FIG. 6 according to the first embodiment.

As illustrated in FIG. 16, the classification labels corresponding to the corresponding identification numbers are associated with the second defect positions as the diversion labels. In this example, no diversion label is provided to the second defect position being a pseudo defect, such as the second defect position with the identification number "102".

The third embodiment illustrates the binary auxiliary labels, but the structure is not limited thereto. For example, values of the probability from 0 to 100 may be adopted as the auxiliary labels. In this case, at Step S1402 in FIG. 14, it suffices that the mapping unit 102 determines whether or not the auxiliary label indicates the probability equal to or larger than the threshold, the process proceeds to Step S402 when the probability is equal to or larger than the threshold, and the process proceeds to Step S1403 when the probability is smaller than the threshold.

According to the third embodiment described above, for example, when the auxiliary labels indicating the probability of the defect are provided to the second inspection information in advance, no diversion labels are provided to pseudo defects having low probability of the defect. This structure enables provision of classification labels only to truly significant defects with effective use of auxiliary labels. This structure enables automatic generation of proper classification labels as labels, enables labor saving for the manual classification work, and is expected to achieve the effect of application to determination of the quality of the product, in the same manner as the first embodiment.

Fourth Embodiment

In the fourth embodiment, the influence range of the defect according to the type of the defect is considered. For example, a pinhole defect, such as a hole, rarely has an influence on a wide range, and is considered to be rarely imaged as a wide-range defect regardless of the type of the imaging system. By contrast, defects, such as a scratch and a stain, are considered to be detected in a different range as defects with some imaging systems. For this reason, the fourth embodiment has a structure of determining diversion labels in consideration of influence ranges of respective types of defects to enable more flexible determination of diversion labels.

The configuration of the defect management apparatus 10 is the same as that in the first embodiment, and an explanation thereof herein is omitted. Suppose that first inspection information and second inspection information are the same as those in the first embodiment.

The following is an explanation of an example of influence ranges of defects according to the fourth embodiment with reference to FIG. 17.

FIG. 17 illustrates a table illustrating influence ranges corresponding to classification labels. The item of the classification label in the table corresponds to the classification labels illustrated in FIG. 2. For example, because the classification label "2" is supposed to indicate a hole defect, the classification label "2" has a small influence range corresponding thereto, and the influence range is "1". For this reason, the influence range thereof is only the coordinates in which the defect exists.

By contrast, because the classification label "4" is supposed to indicate a scratch defect, the classification label "4" has a large influence range corresponding thereto, and the influence range is "3". For this reason, the defect has an influence range including more two pairs of coordinates around the coordinates in which the defect exists. Specifically, the influence range has a 3×3 size, with the coordinates including the defect serving as the center.

With respect to the influence range corresponding to the classification label, for example, when the supposed defect sizes are set in advance for the respective types of defects in the first inspection device 20, the defect sizes can be used as the influence ranges. As another example, in the case where the defect size can also be calculated in the inspection with the first inspection device 20, when the first inspection information includes information relating to the defect size together with the classification label, the influence range may be set by aggregating pieces of the information relating to the defect size and subjecting the aggregated information to statistical processing, such as calculation of the mean value thereof.

The following is an explanation of an operation example of the mapping unit 102 according to the fourth embodiment with reference to a flowchart of FIG. 18. The processing steps at Step S401, Step S402, and Step S404 to Step S408 are the same as those in FIG. 4.

At Step S1801, the mapping unit 102 determines whether or not the second defect position exists outside the influence range of the classification label corresponding to the first defect position. Specifically, the mapping unit 102 determines whether or not the second defect position exists outside the influence range of the classification label of the corresponding first defect position, with reference to the table of the correspondence between the classification label and the influence range as illustrated in FIG. 17. When the second defect position exists outside the influence range, the process proceeds to Step S404, and the mapping unit 102 determines that no corresponding defect exists. By contrast, when the second defect position exists within the influence range of the classification label of the corresponding first defect position, the process proceeds to Step S405.

The following is an explanation of an example of processing results with the mapping unit 102 according to the fourth embodiment with reference to FIG. 19.

FIG. 19 illustrates a table illustrating correspondence between the identification numbers of the second defect positions and the corresponding identification numbers of the corresponding defect positions, in the same manner as FIG. 5.

For example, the second defect position (7, 19) with the identification number "113" may be associated with the first defect position (6, 19) with the identification number "012" and the first defect position (8, 19) with the identification number "013" that have the same distance from the second defect position, as the corresponding identification numbers. However, the identification number "012" is provided with the classification label "2", and the identification number "013" is provided with the classification label "1". Because the classification label "2" has the influence range "1" and the classification label "1" has the influence range "2", the second defect position (7, 19) is not included in the influence range of the classification label "2", but included in the influence range of the classification label "1". Accordingly, the first defect position with the identification number "013" provided with the classification label "1" is determined as the corresponding defect position, and the identification number "013" is determined as the corresponding identification number.

FIG. 20 illustrates an example of processing results with the label diversion unit 103 according to the fourth embodiment.

Operations of the label diversion unit 103 according to the fourth embodiment are the same as the operations of the label diversion unit 103 illustrated in FIG. 6 according to the first embodiment.

As illustrated in FIG. 20, it suffices that the label diversion unit 103 sets the classification labels associated with the corresponding identification numbers as diversion labels.

According to the fourth embodiment described above, diversion labels are determined using influence ranges of defects based on types of the defects. This structure enables diversion of optimum classification labels according to types of the defects, in diversion of labels between inspection devices having different imaging systems. This structure enables labor saving for the manual classification work, by effective use of classification labels generated with the first inspection device as diversion labels relating to the second defect positions of the second inspection device, in the same manner as the first embodiment.

Fifth Embodiment

The fifth embodiment is supposed to be applied to the case where each of a first inspection device 20 and a second inspection device 30 is capable of acquiring classification labels, but correspondence of classification labels between the first inspection device 20 and the second inspection device 30 is not identified. For example, in the case of executing appearance inspection with the first inspection device 20 and executing functional inspection with the second inspection device 30 thereafter, it is unclear as what defect in the functional inspection is detected in the appearance inspection. Because the product cannot be used as a product when it is defective in the functional inspection, it is desirable to recognize, at the stage of the appearance inspection, correspondence of defects leading to defectiveness in the functional inspection. The fifth embodiment enables improvement in efficiency of manufacturing by extraction of co-occurrence relation between defects to generate diversion labels.

The following is an explanation of a specific example of second inspection information acquired with the second inspection device 30 according to the fifth embodiment, with reference to FIG. 21. Suppose that first inspection information acquired with the first inspection device 20 is the same as that in the first embodiment.

FIG. 21 (a) is a schematic diagram illustrating a second inspection image of the product serving as the inspection target imaged with the second inspection device 30, in the same manner as FIG. 3 (a). FIG. 21 (b) illustrates a table illustrating second inspection information in which coordinate information of defect positions 22 in FIG. 13 (a) is extracted, in the same manner as FIG. 3 (b).

As illustrated in FIG. 21 (b), the second inspection information is also provided with classification labels for the second defect positions. In this example, classification labels "A" to "D" are provided according to types of defects. For the sake of convenience of explanation, to illustrate correspondence with FIG. 21 (a), types of patterns indicating the defect positions, such as vertical ruled lines and horizontal ruled lines, are illustrated as information of the classification labels, information relating to types of patterns of classification labels are not necessarily included in the second inspection information.

Figure 22:
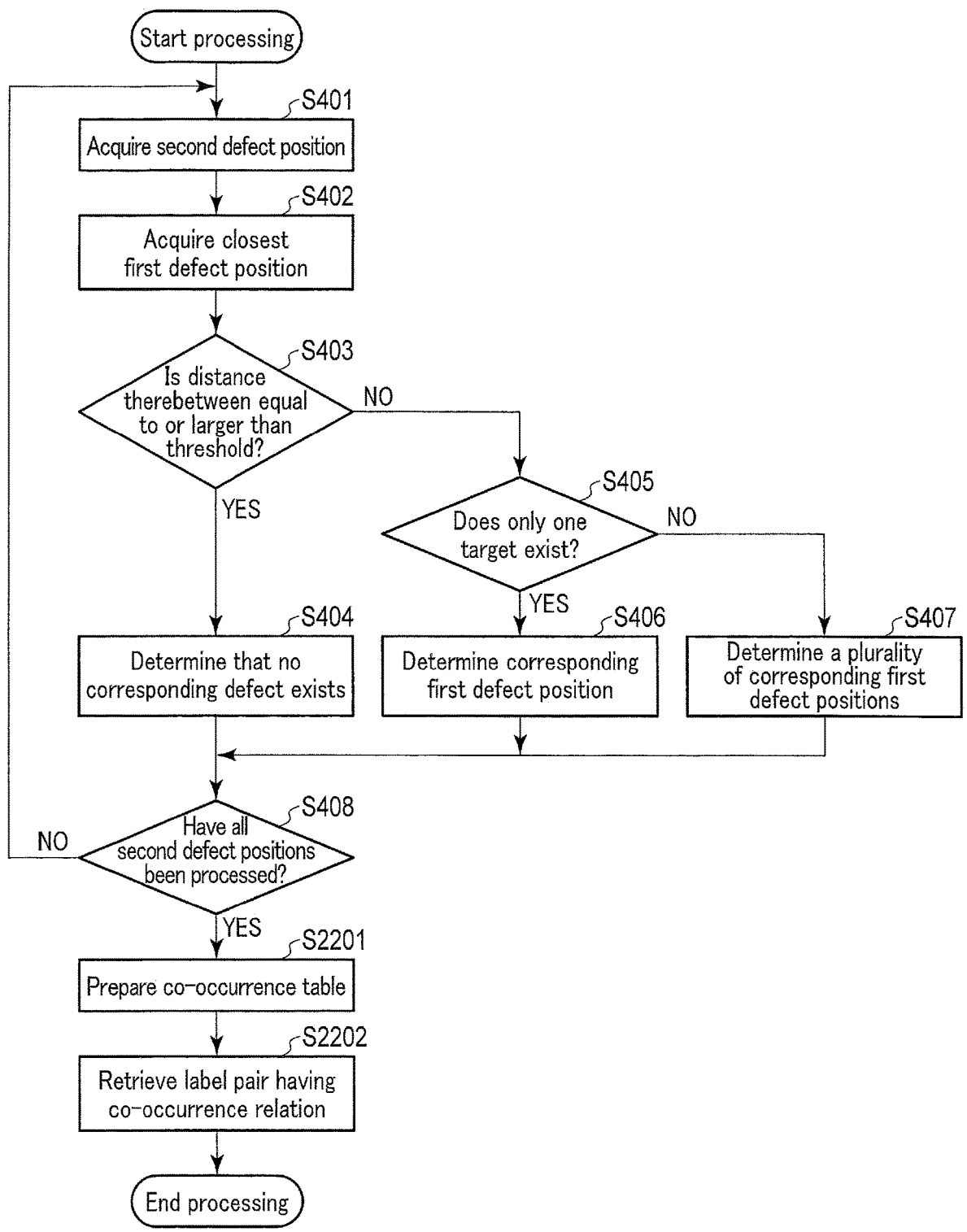
FIG. 22 is a flowchart illustrating an operation example of a mapping unit according to the fifth embodiment.

The following is an explanation of an operation example of a mapping unit 102 of a defect management apparatus 10 according to the fifth embodiment with reference to a flowchart of FIG. 22.

The processing steps at Step S401 to Step S408 are the same as those in FIG. 4, and an explanation thereof herein is omitted.

At Step S2201, the mapping unit 102 generates a co-occurrence table. The co-occurrence table is a table associating the classification labels (also referred to as "first classification labels") acquired with the first inspection device 20, the classification labels (also referred to as "second classification labels") acquired with the second inspection device, and the co-occurrence frequency.

At Step S2202, the mapping unit 102 retrieves a classification label pair having a co-occurrence relation, with reference to the co-occurrence table. The process with the mapping unit 102 according to the fifth embodiment is ended thereafter.

The following is an explanation of an example of the co-occurrence table according to the fifth embodiment, with reference to FIG. 23.

FIG. 23 illustrates a co-occurrence table illustrating the degrees of co-occurrence frequency between the classification labels of the first inspection information illustrated in FIG. 2 and the classification labels of the second inspection information illustrated in FIG. 21.

The mapping unit 102 calculates a co-occurrence label pair for each of types of the second classification labels. In this example, a combination of the type of the second classification label and the first classification label having the highest co-occurrence frequency with the type of the second classification label is calculated as a co-occurrence label pair, for each of types of the second classification labels.

Specifically, for example, although the first classification label "1" and the first classification label "2" co-occur with the second classification label "C", the first classification label "2" having the highest frequency is selected. Specifically, the second classification label "C" and the first classification label "2" are set as a co-occurrence label pair. When the co-occurrence label pair is abbreviated to "C-2", the co-occurrence label pairs illustrated in FIG. 23 are "A-1", "B-3", "C-2", and "D-4" illustrated with a broken-line box.

The following is an explanation of processing results with the mapping unit 102 according to the fifth embodiment, with reference to FIG. 24.

FIG. 24 illustrates a table in which the identification numbers of the second defect positions are associated with co-occurrence label pairs.

For example, the second defect position (7, 6) with the identification number "104" is determined as having no corresponding identification number in the processing at Step S404 illustrated in FIG. 22. However, in the processing at Step S2202, because the second classification label "C" is provided to the second defect position (X=7, Y=6) with the identification number "104", the mapping unit 102 can associate the cooccurrence label pair "C-2" with the identification number "104" with reference to the co-occurrence label pair in the co-occurrence table.

In addition, with respect to the second defect position (7, 19) with the identification number "114", two corresponding defect positions can be selected, that is, the first defect positions with the corresponding identification numbers "012" and "013" can be selected in the processing at Step S407 illustrated in FIG. 22. However, in the processing at Step S2202, because the second classification label "C" is provided to the second defect position (7, 19) with the identification number "114", the mapping unit 102 can associate the cooccurrence label pair "C-2" with the identification number "114" in the same manner.

FIG. 25 illustrates an example of processing results with the label diversion unit 103 according to the fifth embodiment.

It suffices that the label diversion unit 103 sets the first classification label included in the co-occurrence label pair as the diversion label, for each of the second defect positions.

According to the fifth embodiment described above, the diversion labels of the second inspection device are generated in accordance with co-occurrence relations between the first classification labels provided in the first inspection device and the second classification labels provided in the second inspection device. This structure enables setting of optimum classification labels even for defects overlooked in one of the inspection devices. This structure enables labor saving for the manual classification work, by effective use of the generated classification labels as diversion labels, in the same manner as the first embodiment.

Sixth Embodiment

In the sixth embodiment, a classification model is learned using the diversion labels illustrated in the first embodiment to the fifth embodiment as labels. This structure enables provision of classification types of defects to an image acquired with an inspection device having characteristics with difficulty in provision of labels, and enables generation of a classification model that can be used for early abnormality detection and yield estimation.

A defect management apparatus 10 according to the sixth embodiment will be explained hereinafter with reference to a block diagram of FIG. 26.

The defect management apparatus 10 according to the sixth embodiment includes an acquisition unit 101, a mapping unit 102, a label diversion unit 103, a storage 104, a learning unit 105, and a training model storage 106.

The learning unit 105 receives second inspection information provided with diversion labels stored in the storage 104. The learning unit 105 generates a trained model by training a network model using the training data. When inspection information is input, the trained model learned using the training data described above can be used as a classification model to output presence/absence of defects and types of the defects for the inspection information.

An ordinary neural network model, such as a deep convolutional neural network (DCNN), can be adopted as the network model. The network model has a structure in which a number of neurons and networks indicating connection relations between the neurons are connected in a plurality of layers. In each of paths, weight parameters indicating the strength of connection between the neurons is defined. A neuron integrates signals into a value with a weighted sum using the signals output from a plurality of connected networks and the weight parameters, and outputs a signal processed by nonlinear transformation to the subsequent neuron. In the network model according to the present embodiment, the number of neurons in the last layer is set to coincide with the number of classes relating to classification to express the likelihood of each of the classes for the input.

The trained model storage 106 stores therein the trained model generated with the learning unit 105. The defect management apparatus 10 may include no trained model storage 106, but may output the trained model to the outside.

Figure 27:
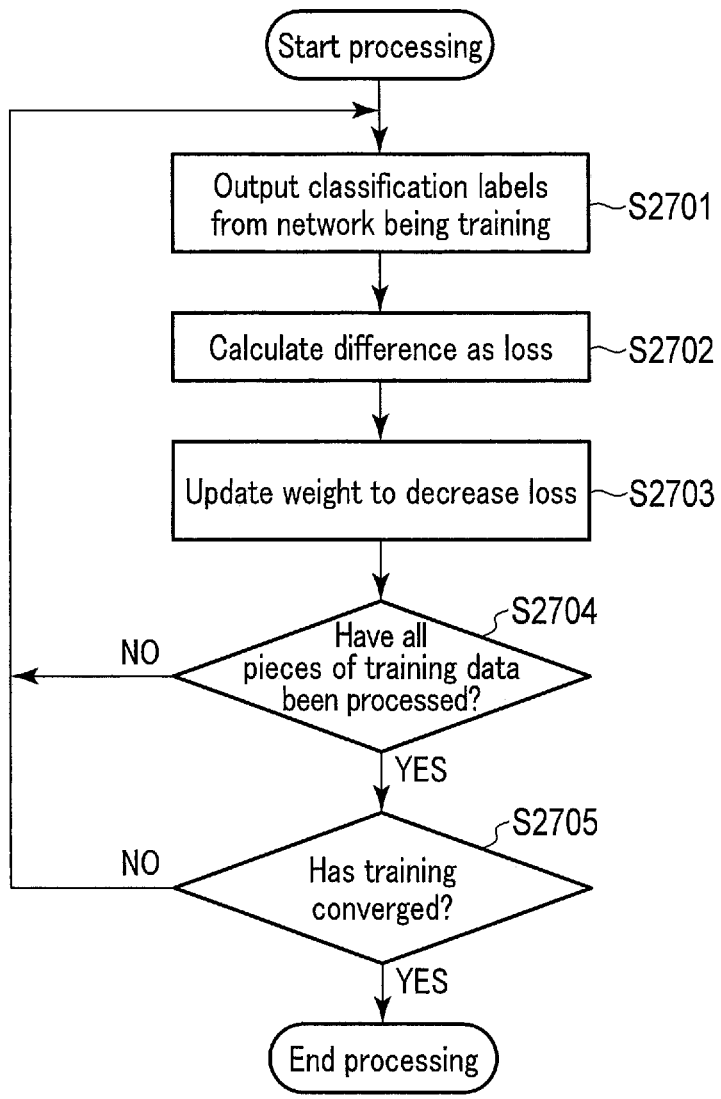
FIG. 27 is a flowchart illustrating training processing with a learning unit of the defect management apparatus according to the sixth embodiment.

The following is an explanation of training processing with the learning unit 105 of the defect management apparatus 10 according to the sixth embodiment, with reference to a flowchart of FIG. 27.

At Step S2701, the learning unit 105 inputs an image of the second inspection device 20 included in the training data to the network model being training, and outputs classification labels from the network model.

At Step S2702, the learning unit 105 calculates a difference between diversion labels serving as labels taught as correct answers corresponding to the input image and the classification labels acquired at Step S2701, as a loss.

At Step S2703, the learning unit 105 updates the weight parameters of the network model using a loss function to decrease the loss by the error back propagation method.

At Step S2704, the learning unit 105 determines whether or not all the pieces of training data have been processed. When all the pieces of training data have been processed, the process proceeds to Step S2704. When any piece of unprocessed training data exists, the process returns to Step S2701, and the same processing is repeated.

At Step S2705, the learning unit 105 determines whether or not training of the network model has converged. For example, conditions to be used for determination are ordinary training finish conditions in machine learning, such as whether or not training of a predetermined number of epochs has been finished, and whether or not the training curve converges to a value equal to or smaller than the predetermined value. In this manner, the trained model is generated. When training has not been finished, the process returns to Step S2701, and the same processing is repeated.

According to the sixth embodiment described above, a network model is trained using training data formed of pairs of images captured with the second inspection device and diversion labels, with the diversion labels corresponding to the second inspection information illustrated in the first embodiment to the fifth embodiment used as correct data. This structure enables generation of a classification model to output classification labels, when a captured image of the second inspection device is input.

Seventh Embodiment

The seventh embodiment is supposed to be applied to the case where the probability is also provided in the classification labels provided to the first inspection device.

Figure 28:
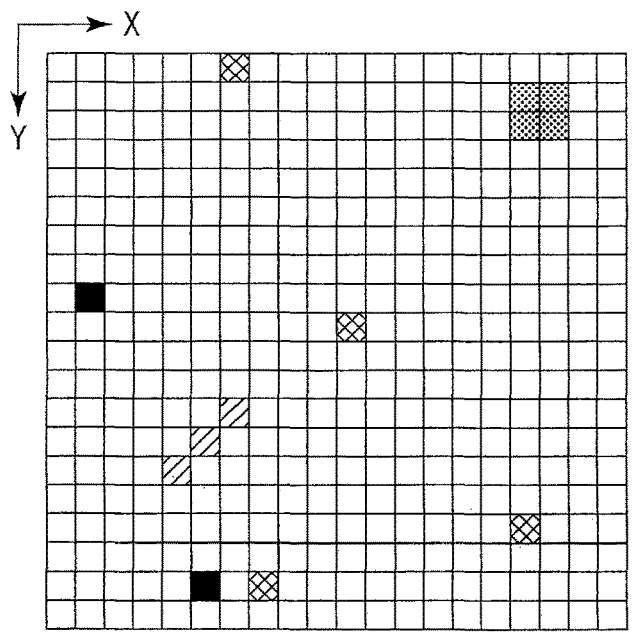
FIG. 28 is a diagram illustrating an example of first inspection information acquired by extracting defect positions acquired with a first inspection device according to a seventh embodiment.

The following is an explanation of a first inspection information table in which defect positions acquired with a first inspection device 20 according to the seventh embodiment are extracted, with reference to FIG. 28. Suppose that first inspection information is the same as that of the first embodiment.

FIG. 28 illustrates a table similar to the table illustrated in FIG. 2 (b), but probability indicating likelihood of the classification label is further associated with each of the classification label of the first inspection device 20. The probability is supposed to be a value calculated when the classification label is provided in the first inspection device 20, but the probability may be calculated for the classification label with another device.

The following is an explanation of operations of a label diversion unit 103 according to the seventh embodiment, with reference to a flowchart of FIG. 29.

The processing steps at Step S601 to Step S605 and Step s607 are the same as those in the first embodiment.

At Step S2901, the label diversion unit 103 sets the classification label associated with the identification number having the highest probability in a plurality of corresponding identification numbers, as the diversion label. For example, in FIG. 6 and FIG. 7 according to the first embodiment, the first defect positions with the identification numbers "012" and "013" are extracted for the second defect position with the identification number "113", and the diversion label is determined at random. In the seventh embodiment, with reference to FIG. 28, the identification number "012" has the probability "0.40", and the identification number "013" has the probability "0.90". For this reason, the classification label corresponding to the first defect position with the identification number "013" is set as the diversion label.

Figure 30:
FIG. 30 is a diagram illustrating an example of processing results with the label diversion unit according to the seventh embodiment.
Figure 30:
Figure 30:
Figure 30:
Figure 30:
Figure 30:
Figure 30:
Figure 30:
Figure 30:
Figure 30:
Figure 30:
Figure 30:
Figure 30:

The following is an explanation of an example of processing results with the label diversion unit 103 according to the seventh embodiment, with reference to FIG. 30.

FIG. 30 illustrates processing results acquired by adding the item of probability of the diversion label to the table illustrated in FIG. 8. For example, the classification label of the second defect position "113" is the classification label "1" provided to the corresponding defect position with the identification number "013", and the corresponding probability "0.90" is also stored in association.

The following is an explanation of training processing with the learning unit 105 of the defect management apparatus 10 according to the seventh embodiment, with reference to a flowchart of FIG. 31.

The processing steps other than Step S3101 are the same as those in FIG. 27, and an explanation thereof is omitted.

At Step S3101, the learning unit 105 updates the weight parameters to decrease the loss calculated at Step S2702. In this operation, the update degree (update step width) of the weight parameters are weighted using the probability. For example, because the lower probability of the classification label indicates the higher probability that the classification label serving as the correct data is not correct, weighting should be performed to decrease the update degree (update step width) of the weight parameters to prevent the classification label with low probability from having an influence on learning.

According to the seventh embodiment described above, a network model is learned, with the probability included in correct data, to automatically select correspondence between the first defect position and the second defect position in training and control the intensity of training in accordance with the probability of the classification label. This structure enables generation of a trained model trained using more reliable information.

Eighth Embodiment

In the eighth embodiment, when training data is generated, data is selected using the probability.

Figure 32:
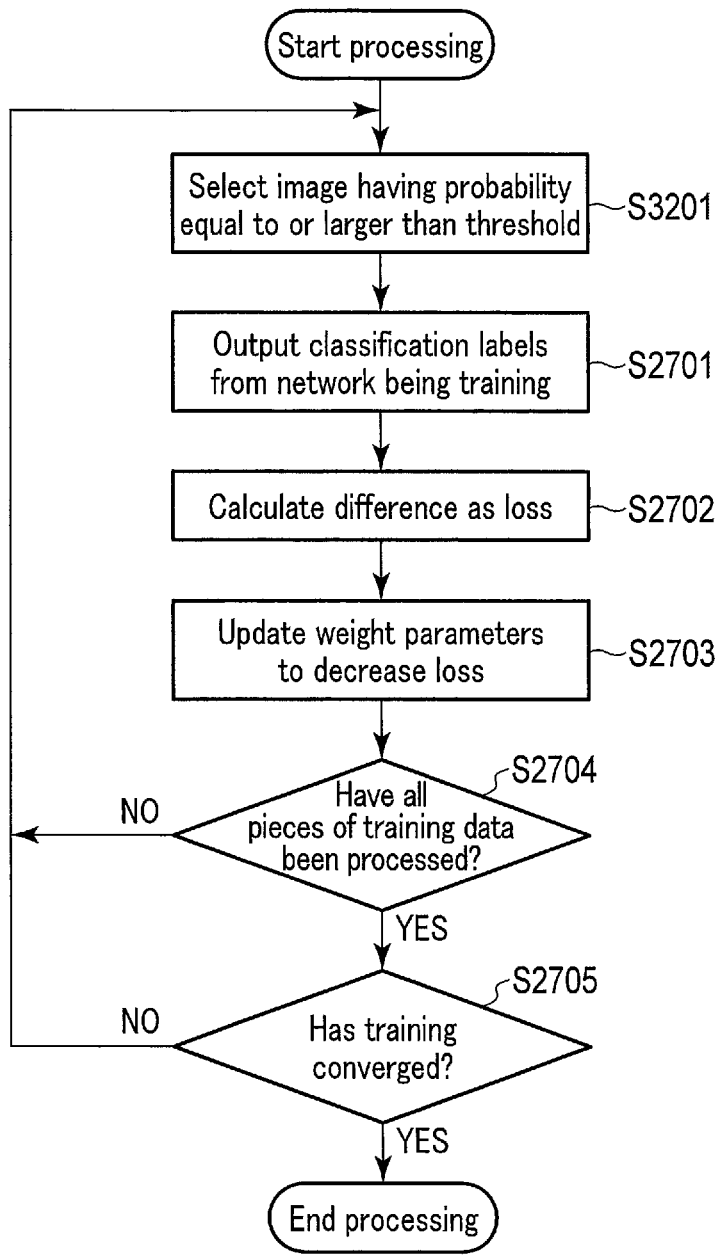
FIG. 32 is a flowchart illustrating training processing with a learning unit of a defect management apparatus according to an eighth embodiment.

The following is an explanation of training processing with a learning unit 105 according to a defect management apparatus 10 according to the eighth embodiment, with reference to a flowchart of FIG. 32.

At Step S3201, the learning unit 105 determines the classification labels each having the probability exceeding the threshold, as training data. For example, the learning unit 105 selects second defect positions corresponding to diversion labels each having probability equal to or larger than the threshold, in the data stored in the storage 104. When the table in FIG. 30 is used as an example, supposing that the threshold is "0.9", the learning unit 105 pairs of the second defect positions with the identification numbers "101, 103, 105 to 107, and 110 to 113" and the diversion labels thereof, as the training data. The processing following Step S3201 is the same as that in FIG. 27, and an explanation thereof is omitted.

According to the eighth embodiment described above, a network model is learned using training data including pairs of the defect positions each having the probability equal to or larger than the threshold and the classification labels as correct data. This structure enables removal of unreliable data from the training data according to the probability, and enables achievement of learning using more reliable training data.

Ninth Embodiment

In the ninth embodiment, inference is executed using the trained model generated in any one of the sixth embodiment to the eighth embodiment.

The following is an explanation of a defect management apparatus according to the ninth embodiment, with reference to a block diagram of FIG. 33.

A defect management apparatus 10 includes an acquisition unit 101, a mapping unit 102, a label diversion unit 103, a storage 104, a learning unit 105, a trained model storage 106, and an inference unit 107.

The inference unit 107 receives an inspection image from the second inspection device 30, and receives a trained model from the trained model storage 106. The inference unit 107 inputs the inspection image to the trained model, and outputs presence/absence of defects in the inspection image, and types of the defects when the defects exist, as an inference result.

According to the ninth embodiment described above, a trained model is used to enable provision of classification labels to the inspection image. For example, supposing that the second inspection device has difficulty in provision of classification labels and inspection with the first inspection device requires time while the second inspection device is capable of executing inspection at high speed, this structure enables execution of defect classification similar to classification executed with the first inspection device with the second inspection device capable of executing inspection at high speed, and enables early finding of defects and efficient achievement of yield monitoring.

In the embodiments described above, the defect management apparatus 10 may present the correspondence between the defect images of the second defect positions and the diversion labels stored in the storage 104 to the user. This enables the user to check association between the defect images and the diversion labels and, if necessary, correct the association.

FIG. 34 illustrates an example of hardware configuration of the defect management apparatus 10 according to the embodiments described above.

The defect management apparatus 10 includes a CPU (Central Processing Unit) 41, a RAM (Random Access Memory) 42, a ROM (Read Only Memory) 43, a storage 44, a display device 45, an input device 46, and a communication device 47 that are connected with a bus.

The CPU 41 is a processor executing arithmetic processing and control processing and the like in accordance with programs. The CPU 41 executes various types of processing of the various units (the acquisition unit 101, the mapping unit 102, the label diversion unit 103, the learning unit 105, and the inference unit 107) described above in cooperation with the programs stored in the ROM 43 and the storage 44 and the like, with a predetermined region of the RAM 42 used as the workarea.

The RAM 42 is a memory, such as a SDRAM (Synchronous Dynamic Random Access Memory). The RAM 42 functions as a workarea for the CPU 41. The ROM 43 is a memory storing programs and various types of information therein in an unrewritable manner.

The storage 44 is a device writing and reading data to and from a magnetic recording medium, such as a HDD (Hard Disk Drive), a semiconductor storage medium, such as a flash memory, a magnetically recordable storage medium, such as a HDD, or an optically recordable storage medium. The storage 44 executes writing and reading of data to and from a storage medium in response to control of the CPU 41. The storage 44 operates as the storage 104 and the trained model storage 106.

The display device 45 is a display device, such as a LCD (Liquid. Crystal Display). The display device 45 displays various types of information on the basis of a display signal from the CPU 41.

The input device 46 is an input device, such as a mouse and a keyboard. The input device 46 receives information input by a user's operation as an instruction signal, and outputs the instruction signal to the CPU 41.

The communication device 47 communicates with the external apparatus via a network in response to control of the CPU 41.

The embodiments described above illustrate the examples in which the acquisition unit 101 of the defect management apparatus 10 directly acquires first inspection information from the first inspection device 20 and directly acquires second inspection information from the second inspection device 30, but the structure is not limited thereto. For example, first inspection information and second inspection information may be stored in an external server, such as a cloud, and the acquisition unit 101 may acquire the first inspection information and the second inspection information from the external server.

The flow charts of the embodiments illustrate methods and systems according to the embodiments. It is to be understood that the embodiments described herein can be implemented by hardware, circuit, software, firmware, middleware, microcode, or any combination thereof. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel apparatuses, methods and computer readable media described herein may be embodied in a variety of other forms; furthermore, various omissions, substitutions and changes in the form of the apparatuses, methods and computer readable media described herein may be made without departing from the spirit of the inventions. The accompanying claims and their equivalents are intended to cover such forms or modifications as would fall within the scope and spirit of the inventions.

What is claimed is:

1. A defect management apparatus comprising:
   a first inspection device;
   a second inspection device; and
   a processor, the processor configured to:
      acquire first inspection information and second inspection information, the first inspection information including first defect positions relating to defects detected with the first inspection device for an inspection target and also including corresponding first classification labels indicating classifications of the defects, the second inspection information including second defect positions without classification labels, relating to defects detected with the second inspection device different from the first inspection device for the inspection target;
      determine a first defect position corresponding to a second defect position as a corresponding defect position, based on the first inspection information and the second inspection information; and
      divert the first classification label corresponding to the corresponding defect position as a second classification label of the second defect position,
   wherein if a plurality of first defect positions corresponding to the second defect position exist, the processing circuitry determines the plurality of first defect positions as the corresponding defect positions.

2. The apparatus according to claim 1, wherein the processor maps the first defect positions and the second defect positions on a plane, and determines the first defect position having a distance smaller than a threshold from the second defect position as the corresponding defect position.

3. The apparatus according to claim 1, wherein the processor maps the first defect positions and the second defect positions on a plane when resolution of a first inspection image acquired by imaging the inspection target with the first inspection device is lower than resolution of a second inspection image acquired by imaging the inspection target with the second inspection device, and determines a first defect position including at least part of the second defect position as the corresponding defect position.

4. The apparatus according to claim 1, wherein
   the second inspection information further includes labels each indicating probability of the defect corresponding to the second defect positions, and
   the processor determines the corresponding defect position for the second defect position associated with the label having the probability of the defect equal to or larger than a threshold.

5. The apparatus according to claim 1, wherein
the first inspection information further includes influence ranges for respective types of defects corresponding to the first classification labels, and
the processor determines the first defect position associated with the first classification label having the influence range including at least part of the second defect position, as the corresponding defect position.

6. The apparatus according to claim 1, wherein the processor is further configured to:
train a network model using training data; and
generate a trained model, the training data using an image relating to the second defect positions as input data and the first classification labels diverted as labels of the second defect positions as correct data.

7. The apparatus according to claim 6, wherein
each of the first classification labels is associated with probability of classification of a type of the defect,
the correct data includes the diverted first classification labels and the corresponding probabilities, and
the processor weights and updates weight parameters of the network model according to the probabilities.

8. The apparatus according to claim 6, wherein
each of the first classification labels is associated with probability of classification of a type of the defect, and
the processor trains the network model using training data including first classification labels each having the probability equal to or larger than a threshold in the diverted first classification labels as the correct data, and an image relating to the second defect positions corresponding to the first classification labels each having the probability equal to or larger than the threshold as the input data.

9. The apparatus according to claim 6, wherein the processor is further configured to output an inference result, by inputting a second inspection image imaged with the second inspection device to the trained model, the inference result including presence/absence of defects relating to the second inspection image and including the first classification labels when any defects exist.

* * * * *